United States Patent [19]
Maehara

[11] Patent Number: 6,059,077
[45] Date of Patent: May 9, 2000

[54] DRUM BRAKE

[75] Inventor: Toshifumi Maehara, Saitama, Japan

[73] Assignee: Akebono Brake Industry Co., Ltd., Tokyo, Japan

[21] Appl. No.: 09/108,504

[22] Filed: Jul. 1, 1998

[30] Foreign Application Priority Data

| Jul. 2, 1997 | [JP] | Japan | 9-177229 |
| Jul. 14, 1997 | [JP] | Japan | 9-188388 |
| Aug. 1, 1997 | [JP] | Japan | 9-207993 |

[51] Int. Cl.$^7$ .................................................. F16D 51/00
[52] U.S. Cl. ........................................... 188/325; 188/334
[58] Field of Search .......................... 188/325, 78, 362, 188/363, 364, 334

[56] References Cited

U.S. PATENT DOCUMENTS 2,029,884  2/1936  Majneri .................................. 188/334

FOREIGN PATENT DOCUMENTS

| 561301 | 5/1944 | United Kingdom | 188/325 |
| 2091361 | 7/1982 | United Kingdom | 188/325 |

*Primary Examiner*—Douglas C. Butler
*Assistant Examiner*—Pamela J. Lipka
*Attorney, Agent, or Firm*—Morgan, Lewis & Bockius LLP

[57] ABSTRACT

Within a wheel cylinder, a drive piston and a control piston, the base ends of which receives a hydraulic pressure from a master cylinder, are oppositely disposed while being axially aligned with each other. A primary shoe is pressed by the drive piston, and an anchor reaction force output from a secondary shoe is distributed to and loaded on an anchor portion and the control piston through a control lever. When the anchor reaction force reaches a predetermined value of force or larger, an anchor-reaction-force control link mechanism operates to move the primary shoe apart from a brake drum, thereby checking the increase of the anchor reaction force.

1 Claim, 17 Drawing Sheets

DRUM BRAKE

BACKGROUND OF THE INVENTION

1. Field of the Invention

The present invention relates to a drum brake assembly carried on a vehicle, and more particularly to a drum brake in which the structure of a wheel cylinder for expanding the brake shoes is simplified and made compact, whereby not only the cost to manufacture the drum brake and the weight of the same are reduced but also a stable braking force can be obtained.

2. Description of the Related Art

A conventional drum brake generally comprises an input portion (wheel cylinder), brake shoes which are expanded with a force received from the input portion to generate a braking force, and an anchor portion which supports the brake shoes and receives an anchor reaction force.

Various types of drum brakes have been used for controlling the traveling of vehicles. These drum brakes are classified into a leading trailing type, a two leading shoe type, a duo-servo type and so on.

Of these types of drum brakes, the leading trailing type of a drum brake is constructed such that a couple of brake shoes are oppositely disposed, a wheel cylinder for expanding the brake shoes is disposed between first ends of the shoes, which are opposite to each other, an anchor-portion is disposed between second ends of the brake shoes, and a leading shoe and a trailing shoe are assembled into the drum brake structure. The leading trailing drum brake is advantageous in that the braking force is stably produced and assembling of the parking brake into the drum brake structure is easy.

The two leading shoe type of drum brake includes a couple of leading shoes assembled thereinto. This type of drum brake is further classified into a single drive type (TP1W) and a dual drive type (TP2W). The TP1W drum brake exhibits a high gain of braking force when the brake drum is rotated in the forward direction. In a backward direction of the drum rotation, the drum brake operates as the drum brake of the two trailing shoe type, and exhibits a smaller braking force gain than in the forward direction. The TP2W drum brake has a high braking force gain in both the forward and backward directions.

The duo-servo drum brake includes two brake shoes, primary and secondary shoes, which are linked with each other. A braking force produced by the primary shoe is input to the secondary shoe. The duo-servo drum brake produces a braking force at high gain in both the forward and backward directions.

The two leading shoe type of drum brake requires two wheel cylinders. Because of this, this type of drum brake is high in cost and needs a complexity of the parking brake mechanism.

The duo-servo drum brake produces an extremely high braking effect when comparing with the leading trailing type of drum brake and the two leading shoe type of drum brake. Further, the size reduction of this type of drum brake is easy, and the assembling of the parking brake into the brake structure is easy. However, the duo-servo drum brake is disadvantageous in that it is sensitive to variations of the frictional coefficients of the lining of the brake shoes and of a contact state variation of the rotary brake drum, and hence the braking effect produced by the drum brake greatly varies, providing instable braking characteristics. This problem is serious.

The leading trailing type of drum brake is superior to the remaining ones in that the braking force produced is stable, the assembling of the parking brake is easy, but inferior to the latter in that the braking effect obtained is low. A conventional measure taken for overcoming the insufficient braking effect problem is to increase the performance of the brake booster for the master cylinder and to increase the diameter of the brake drum. The measure makes it difficult to reduce the size of the drum brake.

Thus, those types of conventional drum brakes have advantages and disadvantages. A suitable type of drum brake is properly selected from among those types of drum brakes in accordance with drive performances, use purposes, and production scale and other factors of the vehicles into which the drum brake is incorporated.

In recent, remarkably advanced vehicles, how to improve the braking effect of the drum brake is of significance.

Various approaches to solve the instable braking effect of the duo-servo drum brake have been made and attracts engineer's attention.

An attractive approach of those ones is that the anchor reaction force coming from the brake shoe is used to control the operation of the wheel cylinder for expanding the brake shoes.

Also in the duo-servo drum brake, a wheel cylinder is disposed close to the anchor pin. A pair of hydraulic pistons are extended from the wheel cylinder to the primary and secondary shoes. The primary and secondary shoes are expanded by the hydraulic pistons to be pressed against the brake drum. A highly sophisticated control of hydraulic pressure is essential to stabilize braking force. This hinders simplification of the whole mechanism of the duo-servo drum brake.

Further, in the duo-servo drum brake of which the brake shoes are worn, extremely delicate work is required for the clearance adjustment for the primary and secondary shoes, and sometimes it is necessary to manually adjust the clearances. In this respect, the duo-servo drum brake so as to be little affected by such a clearance adjustment is desirable.

If a brake design is made to control the operation of the wheel cylinder by the anchor reaction force and it needs structural complexity of the wheel cylinder, the size of the wheel cylinder is increased. The increased size of the wheel cylinder leads to increase of size and weight of the drum brake, and increase of cost of the wheel cylinder and the brake per se. The duo-servo drum brake may be constructed such that the anchor reaction force acts on the cylinder body of the wheel cylinder to effect the control of the wheel cylinder operation by the anchor reaction force. In this case, highly rigid and expensive materials must be used for making the cylinder body. This also brings about the cost and size increase of the wheel cylinder.

SUMMARY OF THE INVENTION

Accordingly, an object of the present invention is to provide a drum brake which enables the reaction force output from the brake shoe to control the operation of the wheel cylinder, and realizes structural simplification of the wheel cylinder, size and weight reduction of the wheel cylinder.

Another object of the invention is to provide a drum brake which has high and stable braking effect, allows the parking brake to easily be assembled thereinto, and realizes size and cost reduction of a brake system incorporating a drum brake such as a duo-servo drum brake thereinto.

Further, still another an object of the present invention is to provide a drum brake which can stably produce a braking force while being little affected by such a clearance adjustment.

According to a first aspect of the invention, there is provided a drum brake comprising: A) a couple of a primary shoe and a secondary shoe which are oppositely disposed within a brake drum; B) a wheel cylinder being disposed between first ends of the primary shoe and the secondary shoe; C) a backing plate having an anchor portion being in contact with the first ends of the primary shoe and the secondary shoe to receive anchor reaction forces from the primary shoe and the secondary shoe; D) a control lever for distributing the anchor reaction force output from the secondary shoe to the anchor portion and the control piston, wherein the wheel cylinder comprises: a) a pressure chamber; b) a drive piston being moved to and from the primary shoe by a hydraulic pressure supplied from the pressure chamber; and c) a control piston axially aligned with the control piston, the control piston receiving at a base end thereof a hydraulic pressure supplied to the pressure chamber, and receiving at a fore end thereof the anchor reaction force from the secondary shoe via the control lever, when an urging force by the anchor reaction force exceeds an urging force by the hydraulic pressure, the control piston being moved into the pressure chamber; and E) an anchor-reaction-force control link mechanism comprising: a) a balance link of which one end is rotatably coupled at a position near an end of the secondary shoe that is located closer to the wheel cylinder, the balance link being turned at an angle corresponding to an amount of displacement of the control piston into the pressure chamber; and b) a reaction lever of which one end is rotatably coupled at a position near an end of the secondary shoe that is located closer to the wheel cylinder, and the other end engages the balance link, when the balance link is turned, the reaction lever receiving a tensile force directed to the secondary shoe, wherein, when the anchor reaction force output from the secondary shoe increases to a predetermined value of force or larger, the anchor-reaction-force control link mechanism operates to move the primary shoe apart from the brake drum, to thereby check an increase of the anchor reaction force.

With such a construction, in response to a braking operation, a hydraulic pressure is supplied from the master cylinder to the pressure chamber, and in turn the drive piston is displaced out of the pressure chamber to press the first end of the primary shoe against the brake drum. By the pressing force produced by the drive piston, the primary and secondary shoes are expanded and pressed against the brake drum to generate a braking force.

When the drum brake is in a braking mode, an anchor reaction force that is output from the secondary shoe at its intensity based on a magnitude of the braking effect is distributed at a predetermined ratio to the wheel cylinder and the anchor portion, which are separate from the wheel cylinder, via the control lever.

During the braking operation, when the anchor reaction force is amplified to have a value defined by a fixed magnification (viz., the braking effect reaches a value defined by a predetermined magnification), the urging force by the anchor reaction force acting on the control piston via the control lever increases above the urging force by the hydraulic pressure that is supplied from the master cylinder M/C and acts on the control piston. As a result, the control piston is displaced into the pressure chamber with the anchor reaction force. The balance link rotates of the anchor-reaction-force control link mechanism is turned with the displacement of the control piston.

With the turn of the balance link, the reaction lever is pulled toward the secondary shoe by the balance link which is turned with the displacement of the control piston to load the urging force to move the primary shoe apart from the brake drum. As a result, the pressing force by the drive piston applied to the primary shoe is reduced, to thereby check the increase of the anchor reaction force.

Thus, when the anchor reaction force output from the secondary shoe is increased to have a value defined by a predetermined magnification, the balance link is turned with the displacement of the control piston into the pressure chamber, so that an urging force to move the primary shoe apart from the brake drum, which depends on an amount of turn of the balance link, is transmitted to the primary shoe via the reaction lever. As a result, the urging force to urge the primary shoe to move to the brake drum is reduced, to check the increase of the anchor reaction force.

During the braking operation in a state that the primary shoe is placed under the urging force to move the primary shoe apart from the brake drum by the anchor-reaction-force control link mechanism, if the braking effect decreases or the hydraulic pressure supplied from the master cylinder increases, the urging force by the hydraulic pressure exceeds the anchor reaction force acting on the control piston via the control lever. Therefore, the control piston is displaced again in its advancing direction (to the control lever). By the returning operation of the control piston, the balance link is returned to its original position. As a result, the pulling of the reaction lever by the balance link is removed, and the urging force to move the primary shoe apart from the brake drum is removed, and the pressing force by the drive piston serves as a pressing force to press the primary shoe against the brake drum.

Thus, the control piston which is displaced with the hydraulic pressure from the master cylinder and the anchor reaction force triggers the anchor-reaction-force control link mechanism to operate. The mechanism stabilizes the braking effect so that a ratio of the anchor reaction force to the input force, or the hydraulic pressure, from the master cylinder is settled down at the fixed magnification, whereby the braking effect is checked in variation or stabilized.

Further, the anchor reaction force is distributed, at the predetermined ratio, to the anchor portion and the control piston, which are separate from the wheel cylinder, through the control lever. Therefore, in the drum brake of the invention, the anti-load of the wheel cylinder may be set to be smaller than an anchor reaction force actually produced by the secondary shoe, when comparing with the structure where the anchor portion is integrally coupled to the cylinder body of the wheel cylinder and the anchor reaction force fully acts on the wheel cylinder.

In the wheel cylinder, one drive piston is axially aligned with one control piston in a series fashion. Because of this, the size of the cylinder body when viewed in the direction of the piston diameter may be reduced when comparing with the structure where those pistons are arrayed side by side.

The function to prevent the increase of the anchor reaction force when the anchor reaction force output from the secondary shoe reaches a value defined by the fixed magnification, is exercised by the anchor-reaction-force control link mechanism. Therefore, there is no need of equipping the wheel cylinder with a hydraulic pressure control valve for controlling the supply of the hydraulic pressure to the pressure chamber. As a result, the structure of the cylinder body for slidably supporting both the pistons and defining the pressure chamber may be considerably simplified, and the number of component parts necessary for constructing the wheel cylinder is reduced.

According to a second aspect of the invention, there is provided a drum brake comprising: a couple of a primary shoe and a secondary shoe which are oppositely disposed within a brake drum; a wheel cylinder being disposed between first ends of the primary shoe and the secondary shoe; a backing plate having an anchor portion being in contact with the first ends of the primary shoe and the secondary shoe to receive counter braking forces from the primary shoe and the secondary shoe; an input lever rotatably supported at an end of the primary shoe that is located near the anchor portion, wherein the wheel cylinder is fastened onto the backing plate at a location near the anchor portion, and when the wheel cylinder is brought into contact with one end of the input lever, an urging force is exerted on the primary shoe to press the primary shoe against an inner surface of the brake drum; a pressure plate disposed between the other end of the input lever and the secondary shoe while being along a line including the anchor portion that is stretched therebetween; a control lever held between the secondary shoe and the anchor portion, the control lever being swung about the anchor portion by the counter braking force; a balance link rotatably supported at an end of the secondary shoe that is located near the anchor portion, one end of the balance link being in contact with a swinging end of the control lever, while the other end thereof being in contact with the pressure plate, whereby when the control lever is swung, the balance link moves the pressure plate toward the primary shoe; and a reaction lever having one end held by a lever pin of the primary shoe and the other end being extended toward the secondary shoe and allowed to engage the swinging end of the control lever, when the control lever comes in contact with the balance link and receives a predetermined counter braking force from the secondary shoe, the other end of the reaction lever engaging the swinging end of the control lever to input a force to the pressure plate to reduce a pressing force of the primary shoe.

According to a third aspect of the invention, there is provided a drum brake comprising: a couple of a primary shoe and a secondary shoe which are oppositely disposed within a brake drum; a wheel cylinder being disposed between first ends of the primary shoe and the secondary shoe; a backing plate having an anchor portion being in contact with the first ends of the primary shoe and the secondary shoe to receive counter braking forces from the primary shoe and the secondary shoe; a wheel cylinder for urging the primary shoe to be pressed against an inner surface of the brake drum, the wheel cylinder being fastened onto a backing plate at a position near the anchor portion; a strut stretched between the primary shoe and the secondary shoe in a state that both ends thereof are not fixed to the primary shoe and the secondary shoe respectively, at a position near the anchor portion; a control lever held between the secondary shoe and the anchor portion, the control lever being swung about the anchor portion by the counter braking force; a balance link rotatably supported on the secondary shoe, one end of the balance link being in contact with a swinging end of the control lever while the other end thereof being in contact with the strut, when the control lever is swung, the balance link pressing the strut and moving it toward the primary shoe; and a reaction lever held by the primary shoe so that a first end of the reaction lever is positioned relative to the strut, a second end of the reaction lever, located closer to the secondary shoe, being positioned so as to be allowed to engage with the swinging end of the control lever, when the control lever comes in contact with the balance link and receives a predetermined counter braking force from the secondary shoe, the second end of the reaction lever coming into contact with the swinging end of the control lever, and the reaction lever exerting on the strut a force to reduce a pressing force of the strut to press the primary shoe.

In the thus constructed drum brake, when the wheel cylinder responds to an ordinary braking operation to apply an urging force to the primary shoe, the input lever moves the pressure plate or the strut and the pressure plate or the strut presses the secondary shoe against the brake drum, and its reaction force presses the primary shoe against the brake drum.

When the control lever receives at its base end counter braking force acting on the anchor portion from the secondary shoe, it is swung, and its swinging end is moved toward the secondary shoe to push one end of the balance link.

The balance link is swung when it is pushed by the control lever, and the other end of the balance link pushes the pressure plate and the input lever or the strut, and the pressure plate and the inpur lever or the strut presses the primary shoe against the brake drum, and its reaction force presses the secondary shoe against the brake drum.

Thus, the drum brake of the invention also presses the primary shoe and the secondary shoe against the brake drum with the counter braking force acting on the anchor portion from the secondary shoe, with the aid of the strut.

When the counter braking force acting on the anchor portion from the secondary shoe increases to be in excess of a predetermined value of counter braking force, which is determined by the gaps between the members and the like, or when the amount of swing of the control lever increases, the swinging end of the control lever is brought into engagement with the end of the reaction lever to move the reaction lever toward the secondary shoe. When the counter braking force acting on the anchor portion by the secondary shoe increases to be in excess of a predetermined counter braking force, which is determined by the predetermined gaps between and the ratios of the related members, or when the amount of swing of the control lever increases, the swinging end of the control lever is brought into engagement with the distal end of the reaction lever to move the reaction lever toward the secondary shoe. As a result, the pressing force of the input lever to press the primary shoe upon the brake drum is decreased, and hence the braking force by the primary shoe decreases. The counter braking force acting on the primary shoe also decreases. Then, the pressing force to press this side of the secondary shoe against the brake drum also decreases, the braking force by the secondary shoe decreases, and the counter braking force acting from the secondary shoe on the anchor portion decreases.

When the counter braking force of the secondary shoe acting on the anchor portion decreases to below the predetermined counter braking force, the pressing force to press the primary shoe against the brake drum increases again, and the braking force of the drum brake increases again.

Thus, when the braking force exceeds a predetermined value of braking force, the drum brake of the invention automatically decreases the braking force. In other words, the drum brake has also an automatic braking-force adjusting function.

DETAILED DESCRIPTION OF THE PREFERRED EMBODIMENTS

A preferred form of a drum brake constructed according to the present invention will be described with reference to the accompanying drawings.

Figure 1:
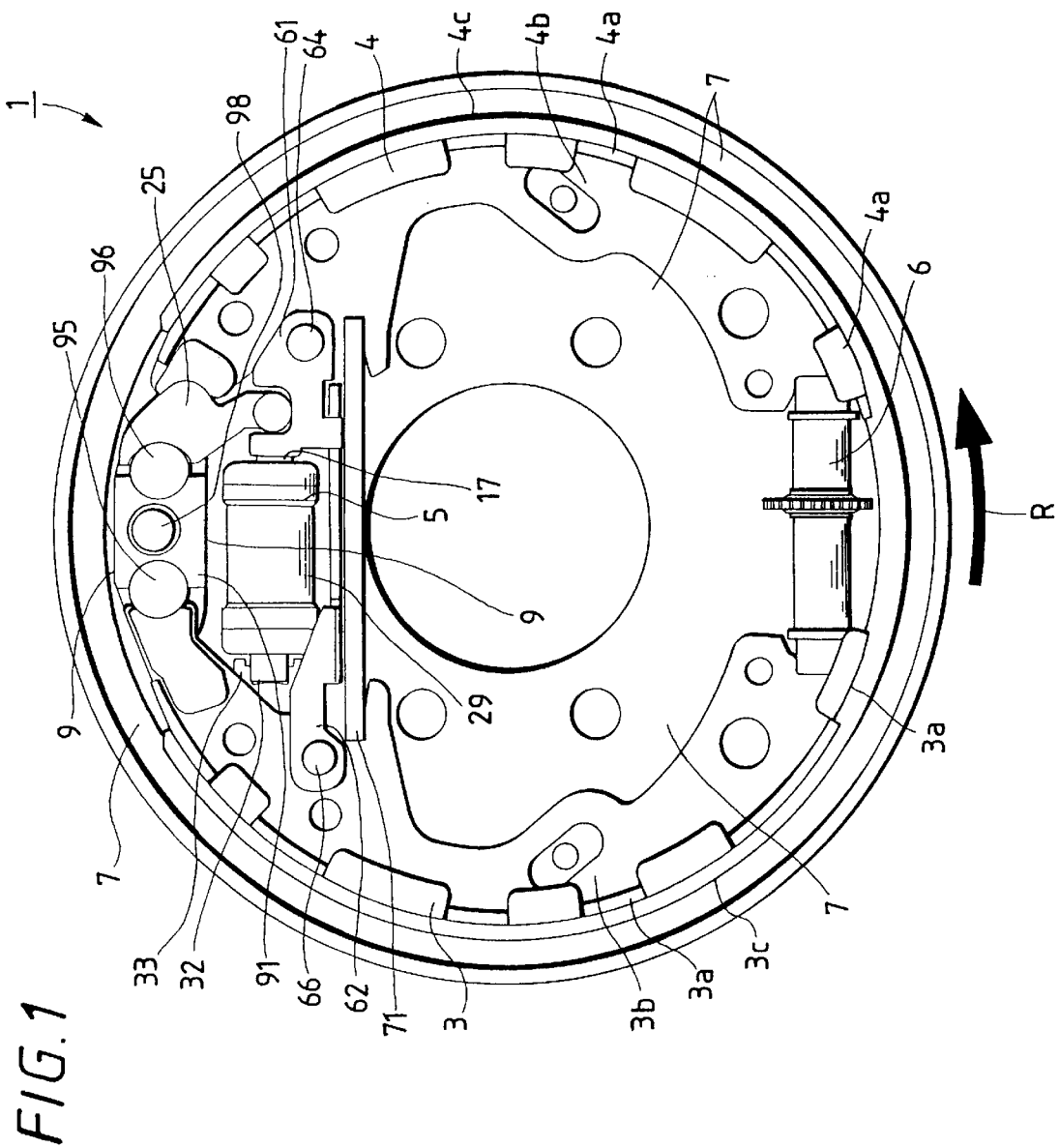
FIG. 1 is a schematic elevational view of an overall structure of a drum brake according to a first embodiment of the present invention.
Figure 2:
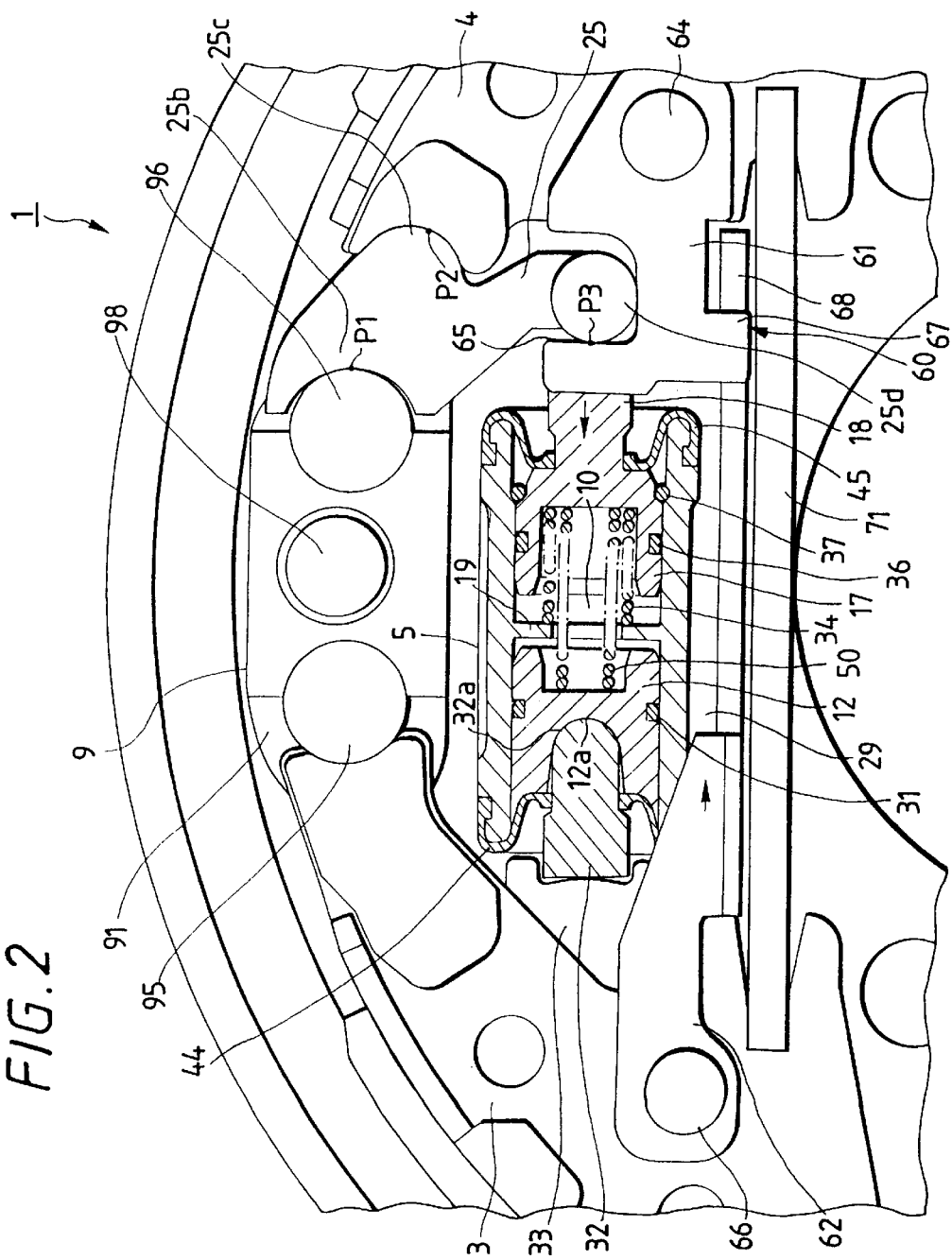
FIG. 2 is an enlarged, sectional view showing a major portion of the drum brake shown in FIG. 1.
Figure 3:
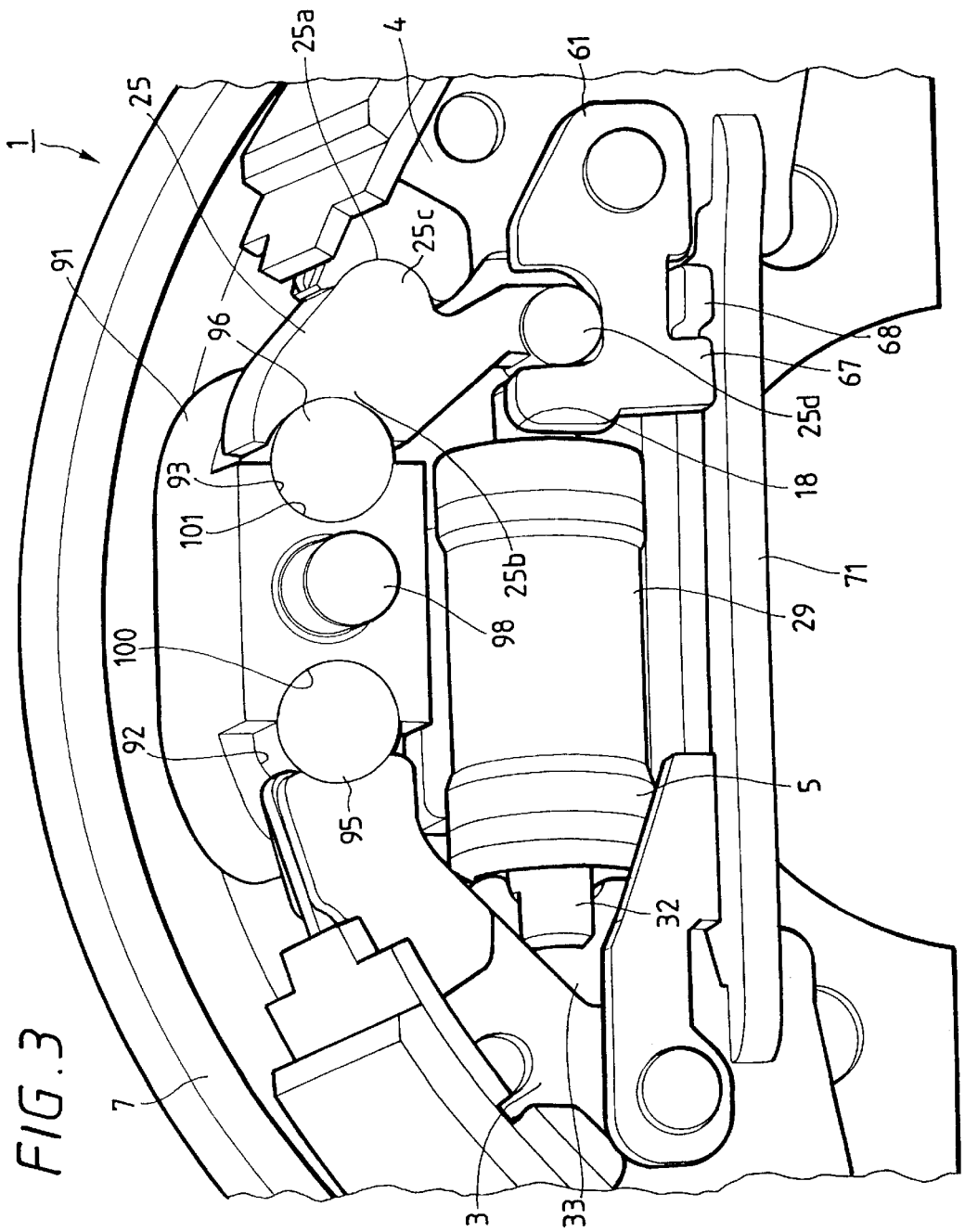
FIG. 3 is an enlarged, perspective view showing a major portion of the drum brake shown in FIG. 1.

FIG. 1 is an elevational view showing a preferred form of a drum brake according to a first embodiment of the present invention. FIG. 2 is an enlarged, sectional view showing a major portion of the drum brake of FIG. 1. FIG. 3 is an enlarged, perspective view showing a major portion of the drum brake shown in FIG. 1.

The drum brake 1 to be discussed hereinafter is so-called duo servo type. The drum brake 1 comprises a couple of the primary shoe 3 and the secondary shoe 4 which are oppositely disposed within a brake drum, the wheel cylinder 5 which is located between the first ends, confronted with each other, of the primary shoe 3 and the secondary shoe 4 and expands the primary shoe 3 and the secondary shoe 4, the adjuster 6 located between the second ends, confronted with each other, of the primary shoe 3 and the secondary shoe 4 serving as a link mechanism so as to input the output of the primary shoe 3 to the secondary shoe 4, the backing plate 7 for supporting those members; and the anchor portion 9 which is located between the first ends of the primary shoe 3 and the secondary shoe 4 and is provided with a pin portion which is to be in contact with the first ends of the primary shoe 3 and the secondary shoe 4, and receives anchor reaction forces from the primary shoe 3 and the secondary shoe 4.

The primary shoe 3 (secondary shoe 4) includes the rim 3a (rim 4a) arcuate along the inner surface of the brake drum, the web 3b (web 4b) expanding radially inward from the rim 3a (rim 4a), and the lining 3c (lining 4c) attached to the outer peripheral surface of the rim 3a (rim 4a). The primary shoe 3 and the secondary shoe 4 are mounted on the backing plate 7 such that these shoes move to and from the inner surface of the brake drum.

The first ends of the primary shoe 3 and the secondary shoe 4, which are mounted on the backing plate 7, are urged to approach to each other (viz., to move apart from the inner surface of the brake drum) by means of a spring (not shown). The same thing is true for the second ends of those brake shoes.

The strut 71 and a parking lever (not shown), which form a parking brake), are assembled into the space between the primary shoe 3 and the secondary shoe 4. One end of the parking lever is coupled with a parking lever pin (not shown) such that it is rotatable to the secondary shoe 4. A mid position of the parking lever is operatively coupled with the strut 71. The primary shoe 3 and the secondary shoe 4 may also be pressed against the brake drum by turning the parking lever (not shown).

The adjuster 6 is used for adjusting the clearance between the ends of the primary shoe 3 and the secondary shoe 4 when it varies with progression of wear of the linings 3c and 4c of those brake shoes. The clearance is automatically adjusted through the operation of an adjuster lever (not shown) of which the tip is brought into contact with the adjusting gear 6a on the adjuster by means of an adjuster spring.

The anchor portion 9, as shown in FIG. 3, is formed with the anchor block 91 mounted on the backing plate 7, and the anchor pins 95 and 96, cylindrical in shape, fit into the holes 92 and 93 at both ends of the anchor block 91. Those pins function as the pin portion.

The anchor block 91 is formed by cutting or forging a metal block. The mid position of the anchor block 91, located between the holes 92 and 93, is bored to form a mounting hole. The spring end 98 is press fit into the mounting hole to fasten the anchor block 91 to the backing plate 7.

A hook of a shoe return spring (not shown) to urge the primary shoe 3 and the secondary shoe 4 to move apart from the brake drum is fastened to the spring end 98.

The first end of the secondary shoe 4 is indirectly coupled, a contact manner, with the anchor pin 96 located closer to the secondary shoe 4 in a state that the control lever 25 is inserted. therebetween. The first end of the primary shoe 3 is directly coupled, in a contact manner, with the anchor pin 95 located closer to the primary shoe 3.

When a vehicle equipped with the drum brake 1 runs in the forward direction, the brake drum rotates in the direction of an arrow R (FIG. 1). Accordingly, when the drum brake 1 is operated during the forward running of the vehicle, the anchor pin 96 receives an anchor reaction force from the secondary shoe 4 via the control lever 25. When the drum brake is operated during the backward running of the vehicle, the anchor pin 95 receives an anchor reaction force from the primary shoe 3.

The anchor pins 95 and 96, cylindrical in shape, extend in the axial direction of the brake drum. Those pins are press fit into the holes 92 and 93, whereby the pins are assembled into the anchor block 91.

A contact surface of the first end of the primary shoe 3 where it contacts with the anchor pin 95 is shaped concave, and its diameter is somewhat larger than that of the outer peripheral surface of the anchor pin 95. A contact surface of the control lever 25 where it contacts with the anchor pin 96 is shaped concave and its diameter is somewhat larger than that of the outer peripheral surface of the anchor pin 96. The contact surface 25a of the control lever 25 where it comes in contact with the first end of the secondary shoe 4 is shaped convex, and a contact surface of the first end of the secondary shoe 4 where it contacts with the contact surface 25a is shaped concave and its diameter is somewhat larger than of the contact surface 25a.

The opposite side walls of the anchor block 91 which are to be in contact with the anchor pins 95 and 96 serve as contact walls 100 and 101, respectively. The anchor pin 95 (96) is sandwiched between the contact wall 100 (101) of the anchor block 91 and the first end of the primary shoe 3 (4), and supported by the latter. To form the contact walls 100 and 101, the anchor block 91 is shaped to be raised at the middle portion having the holes 92 and 93 formed on both sides thereof when viewed from side.

The wheel cylinder 5 is uniquely constructed to overcome the disadvantage of the conventional duo-servo drum brake; its braking effect is instable and unsatisfactory.

Specifically, the wheel cylinder 5 is generally constructed with the pressure chamber 10, drive piston 12, control piston 17 and cylinder body 29 (FIG. 2). A hydraulic pressure is supplied from a master cylinder M/C (not shown) to the pressure chamber 10 in response to a braking operation by a driver, for example. The base end of the drive piston 12 is confronted with the pressure chamber 10, while the fore end thereof is confronted with the end of the primary shoe 3. The drive piston 12 is moved to and from the end of primary shoe 3 with a hydraulic pressure supplied to the pressure chamber 10. The control piston 17 is axially and substantially aligned with the drive piston 12. The base end of the control piston 17 is confronted with the pressure chamber 10, while the fore end thereof is confronted with the end of the secondary shoe 4. The cylinder body 29 defines the pressure chamber 10, and slidably supports the drive piston 12 and the control piston 17.

The drive piston 12 is liquid-tightly and slidably held within the cylinder body 29 by use of the ring-like sealing member 31 that is fit into a seal groove formed around the outer peripheral surface of the cylinder body 29. A spring (e.g., compression coil spring) 50 is inserted between the drive piston 12 and the control piston 17 within the pressure chamber 10. The drive piston 12 is displaced toward the primary shoe 3 by means of the spring 50. The piston rod 32 and the input lever 33 are placed between the fore end of the drive piston 12 and the end, or the first end, of the primary shoe 3, in a contact fashion. The end of the piston rod 32 which is in contact with the drive piston 12 is shaped to have the spherical convex surface 32a. The fore end of the drive piston 12 is shaped to have a spherical concave surface 12a on which the spherical convex surface 32a of the piston rod 32 is rotatable. Thus, a spherical surface contact is set up between the drive piston 12 and the piston rod 32 when those are coupled with each other. With the spherical surface contact, there is eliminated an unwanted twist which otherwise would act on the drive piston 12 at the time of braking.

The control piston 17 is liquid-tightly and slidably held within the cylinder body 29 by use of the ring-like sealing member 36 that is fit into a seal groove formed around the outer peripheral surface of the cylinder body 29. The control piston 17 is movable into the pressure chamber 10, but it is stopped with the stopper ring 37 fit around the cylinder body 29 when it will move toward the secondary shoe 4. The set spring 34 is resiliently placed between the control piston 17 and the spring receiver 19 within the pressure chamber 10. The set spring 34 constantly urges the control piston 17 to move toward the stopper ring 37.

The piston rod 18 is attached to the fore end of the control piston 17 in an integral form. The piston rod 18 is brought into contact with a part of the control lever 25. Part of an anchor reaction force is transmitted from the secondary shoe 4 to the piston rod 18, through the control lever 25.

The control piston 17 receives a hydraulic pressure at the base end from the master cylinder M/C and at the fore end an anchor reaction force from the secondary shoe 4 via the control lever 25. When the anchor reaction force exceeds the hydraulic pressure, the control piston 17 is moved into the pressure chamber 10.

The control lever 25 is formed with the contact portion 25b that comes in contact with the anchor pin 96, the contact portion 25c that comes in contact with the end of the secondary shoe 4, and the contact portion 25d, substantially cylindrical, that comes in contact with the flat fore end of the piston rod 18 (FIG. 2). As shown, an anchor reaction force acting on a contact point P2 on the contact portion 25c of the control lever 25 which is in contact with the secondary shoe 4 turns the control lever 25 about a contact point P1 (as a fulcrum) on the contact portion 25b which is in contact with the anchor pin 96, to transmit the anchor reaction force to a contact point P3 on the contact portion 25d which is to be in contact with the piston rod 18. In this case, the anchor reaction force received from the secondary shoe 4 is divided at a lever ratio defined by the contact points P1 to P3, to reduce the anchor reaction force to be transmitted to the piston rod 18.

The boots 44 and 45 are applied to both ends of the cylinder body 29 at which the piston rods 32 and 18 are located while extending into and out of the cylinder body 29, whereby those boots prevents foreign matters from entering into the inside of the cylinder body 29.

The drum brake 1 of the present embodiment under discussion is equipped with the anchor-reaction-force control link mechanism 60 for controlling the anchor reaction force.

The anchor-reaction-force control link mechanism 60 is generally constructed with the balance link 61 and the reaction lever 62 (FIGS. 2 and 3). One end of the balance link 61 is rotatably coupled with the link pin 64 that is mounted on the secondary shoe 4 at a position near the first end of the secondary shoe 4. The other end of the balance link 61 has the engaging concavity 65. The contact portion 25d of the control lever 25, which is in contact with the piston rod 18, is placed within the engaging concavity 65. The balance link 61 is turned counterclockwise (in FIG. 2) about the link pin 64 at an angle corresponding to an amount of displacement of the control piston 17 into the pressure chamber 10.

One end of the reaction lever 62 is rotatably coupled with lever pin 66 mounted on the primary shoe 3 at a position near the first end of the primary shoe 3. The other end of the reaction lever 62 has the engaging portion 68 which engages the hook piece 67 of the balance link 61. When the balance link 61 is turned, the reaction lever 62 receives a tensile force directed to the secondary shoe 4.

The lever pin 66 is a shaft member providing a fulcrum about which the input lever 33 is turned.

When the drum brake 1 is operated for braking, the master cylinder M/C supplies a hydraulic pressure to the pressure chamber 10 of the wheel cylinder 5; the drive piston 12 is displaced out of the pressure chamber 10; and it presses the first end of the primary shoe 3 against the brake drum. By the pressing by the drive piston 12, the primary shoe 3 and the secondary shoe 4 are expanded to be pressed against the brake drum to generate a braking force. At the time of braking, an anchor reaction force, which is output from the secondary shoe 4 at its intensity based on the braking effect, is distributed through the control lever 25 to the anchor portion 9 and the control piston 17, which are separate from the wheel cylinder 5. In this case, the distributed anchor reaction force is divided at a predetermined ratio.

During the braking operation, when the anchor reaction force is amplified to have a value defined by a fixed magnification (viz., the braking effect reaches a value defined by a predetermined magnification), an urging force by the anchor reaction force acting on the control piston 17 via the control lever 25 increases above an urging force by the hydraulic pressure that is supplied from the master cylinder M/C and acts on the control piston 17. As a result, the control piston 17 is displaced into the pressure chamber 10 with the anchor reaction force. At this time, the balance link 61 of the anchor-reaction-force control link mechanism 60 is turned with the displacement of the control piston 17.

With the turn of the balance link 61, the reaction lever 62 is pulled toward the secondary shoe 4 to transmit to the primary shoe 3 coupled with the reaction lever 62 an urging force to urge the primary shoe 3 to move apart from the brake drum. As a result, the pressing force by the drive piston 12 applied to the primary shoe 3 is reduced.

When the anchor reaction force output from the secondary shoe 4 reaches a value defined by the fixed magnification, the balance link 61 is turned with the displacement of the control piston 17 into the pressure chamber 10, and an urging force to urge the primary shoe 3 to move apart from the brake drum in accordance with an amount of rotation of the balance link 61, is transmitted via the reaction lever 62 to the primary shoe 3. The urging force to urge the primary shoe 3 to move to the brake drum is reduced, to thereby check the increase of the anchor reaction force.

During the braking operation in a state that the primary shoe 3 is placed under the urging force to move the primary shoe 3 apart from the brake drum by the anchor-reaction-force control link mechanism 60, if the braking effect decreases or the hydraulic pressure supplied from the master cylinder M/C increases, the urging force by the hydraulic pressure exceeds the anchor reaction force acting on the control piston 17 via the control lever 25. Therefore, the control piston 17 is displaced again in its advancing direction (to the control lever 25). By the returning operation of the control piston 17, the balance link 61 is returned to its original position. As a result, the pulling of the reaction lever 62 by the balance link 61 is removed, and the urging force to move the primary shoe 3 apart from the brake drum is removed, and the pressing force by the drive piston 12 serves as a pressing force to presses the primary shoe 3 against the brake drum.

As described above, the control piston 17 which is displaced with the hydraulic pressure from the master cylinder M/C and the anchor reaction force drives triggers the anchor-reaction-force control link mechanism 60 to operate. The mechanism stabilizes the braking effect so that a ratio of the anchor reaction force to the input force, or the hydraulic pressure, from the master cylinder M/C is settled down at the fixed magnification, whereby the braking effect is checked in variation or stabilized.

It is noted that the anchor reaction force is distributed, at the predetermined ratio, to the anchor portion 9 and the control piston 17, which are separate from the wheel cylinder 5, through the control lever 25. Therefore, in the drum brake of the invention, the anti-load of the wheel cylinder 5 may be set to be smaller than an anchor reaction force actually produced by the secondary shoe 4, when comparing with the structure where the anchor portion 9 is integrally coupled to the cylinder body of the wheel cylinder 5 and the anchor reaction force fully acts on the wheel cylinder 5.

Further, it is noted that in the wheel cylinder 5, one drive piston 12 is axially aligned with one control piston 17 in a series fashion. Because of this, the size of the cylinder body 29 when viewed in the direction of the piston diameter is may be reduced when comparing with the structure where those pistons are arrayed side by side.

The function to prevent the increase of the anchor reaction force when the anchor reaction force output from the secondary shoe 4 reaches a value defined by the fixed magnification, is exercised by the anchor-reaction-force control link mechanism 60. Therefore, there is no need of equipping the wheel cylinder 5 with a hydraulic pressure control valve for controlling the supply of the hydraulic pressure to the pressure chamber 10. As a result, the structure of the cylinder body for slidably supporting both the pistons and defining the pressure chamber 10 may be considerably simplified, and the number of component parts necessary for constructing the wheel cylinder 5 is reduced.

Next, a drum brake according to a second embodiment of the present invention will be described.

Figure 4:
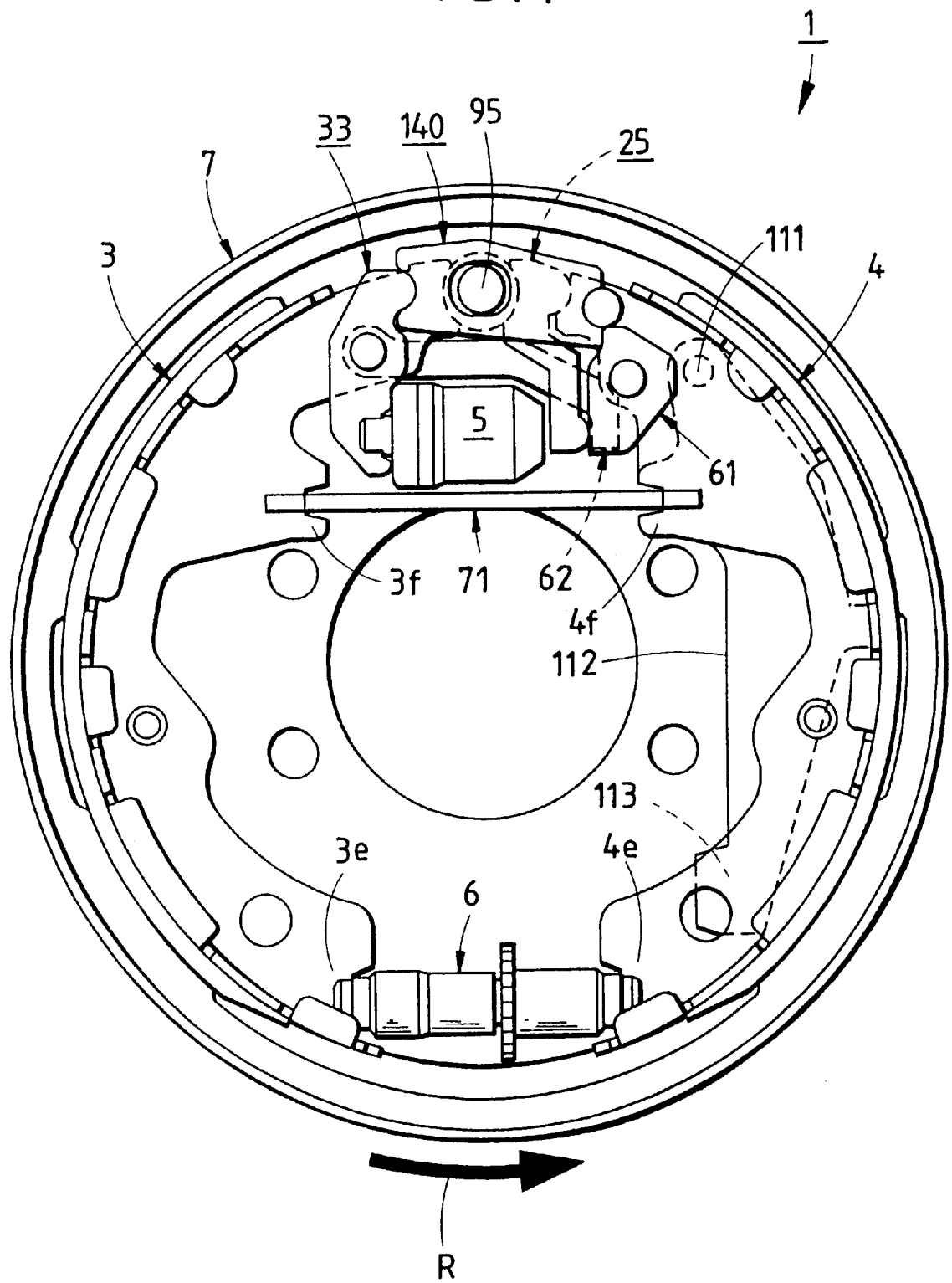
FIG. 4 is a schematic elevational view of an overall structure of a drum brake according to a second embodiment of the present invention.
Figure 5:
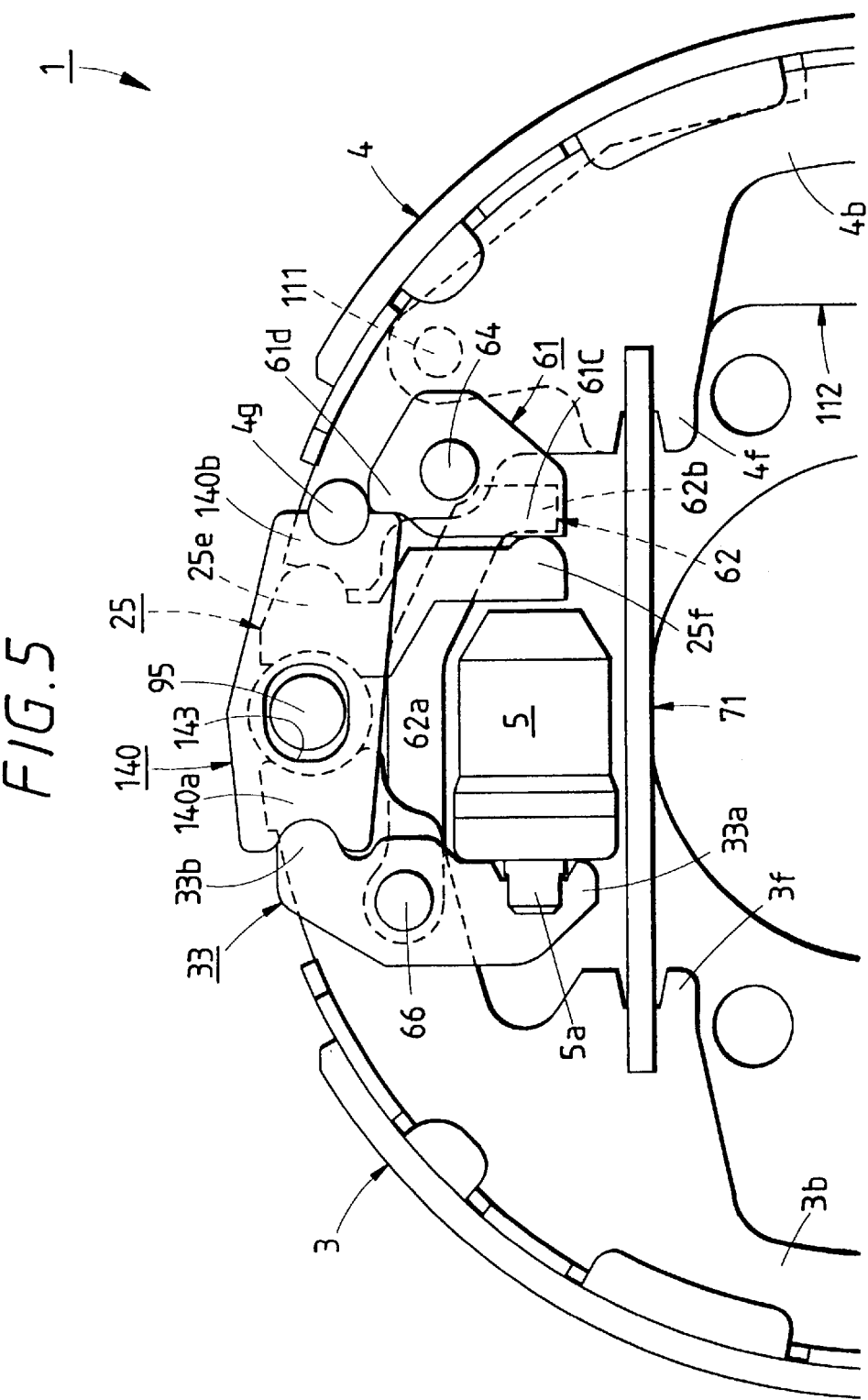
FIG. 5 is an enlarged, elevational view showing a major portion of the drum brake shown in FIG. 4.
Figure 6:
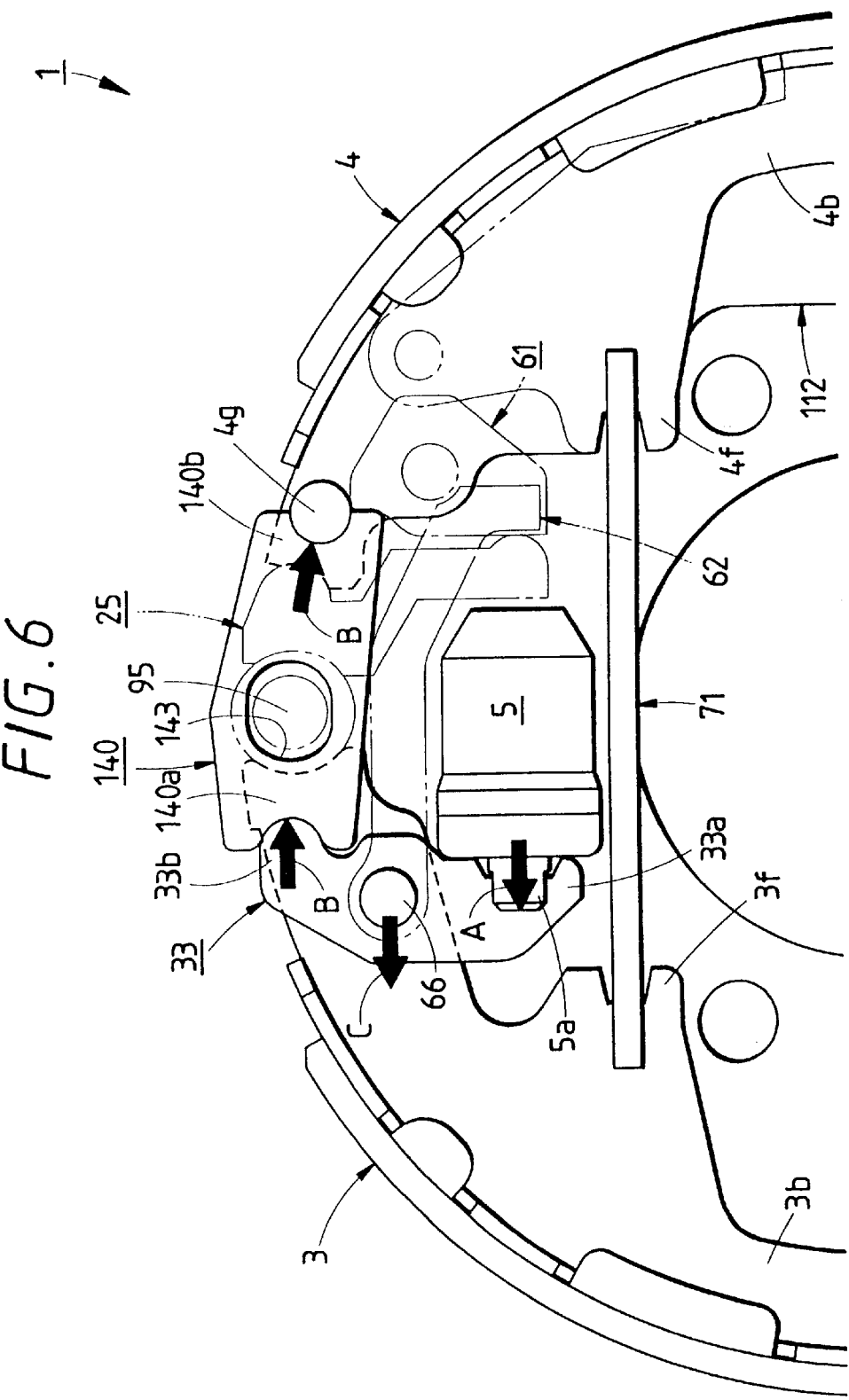
FIG. 6 is an enlarged, elevational view showing the major portion shown in FIG. 5, useful in explaining the operations of a wheel cylinder, an input lever and a pressure plate.
Figure 7:
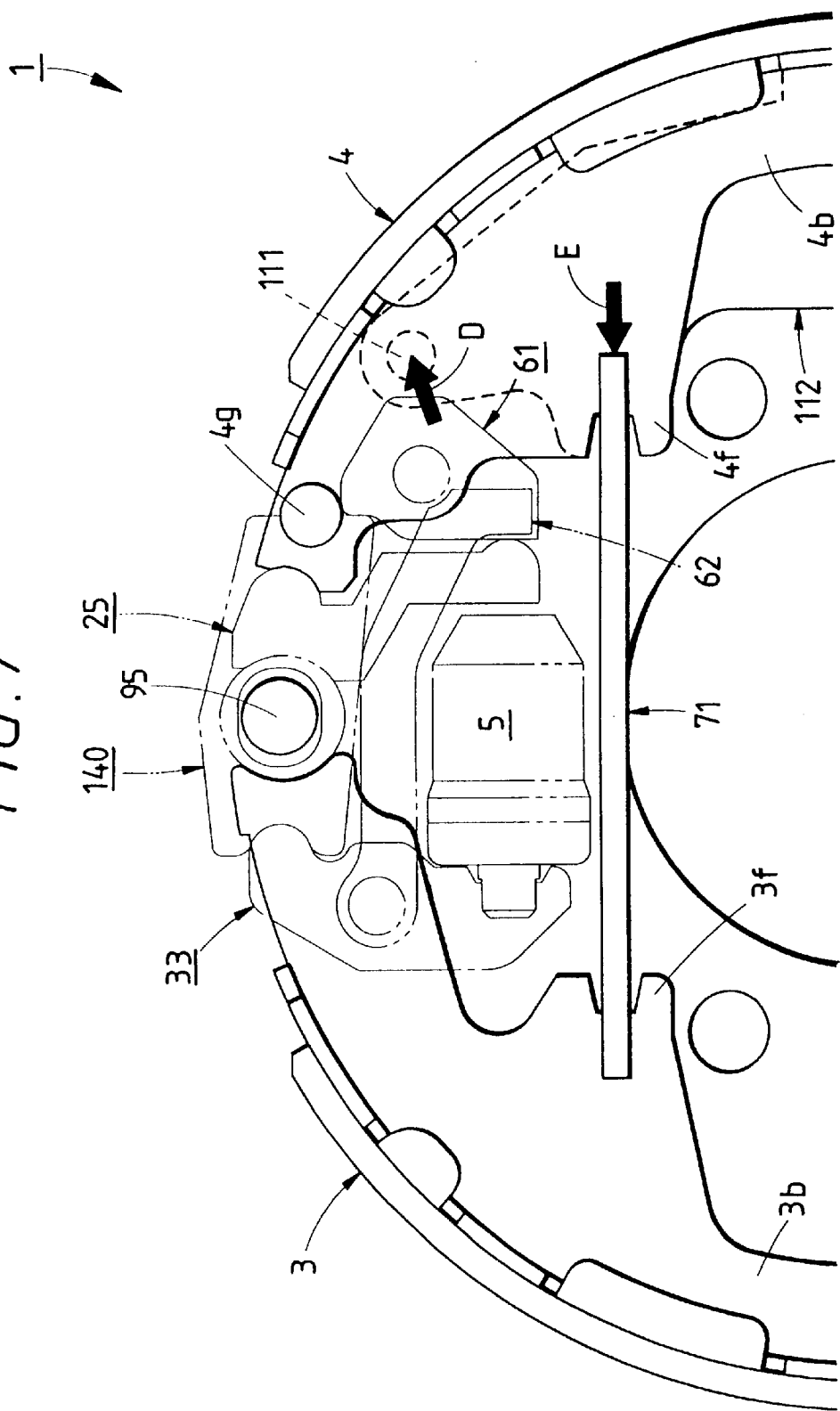
FIG. 7 is an enlarged, elevational view showing the major portion shown in FIG. 5, useful in explaining the operation of a parking lever.
Figure 8:
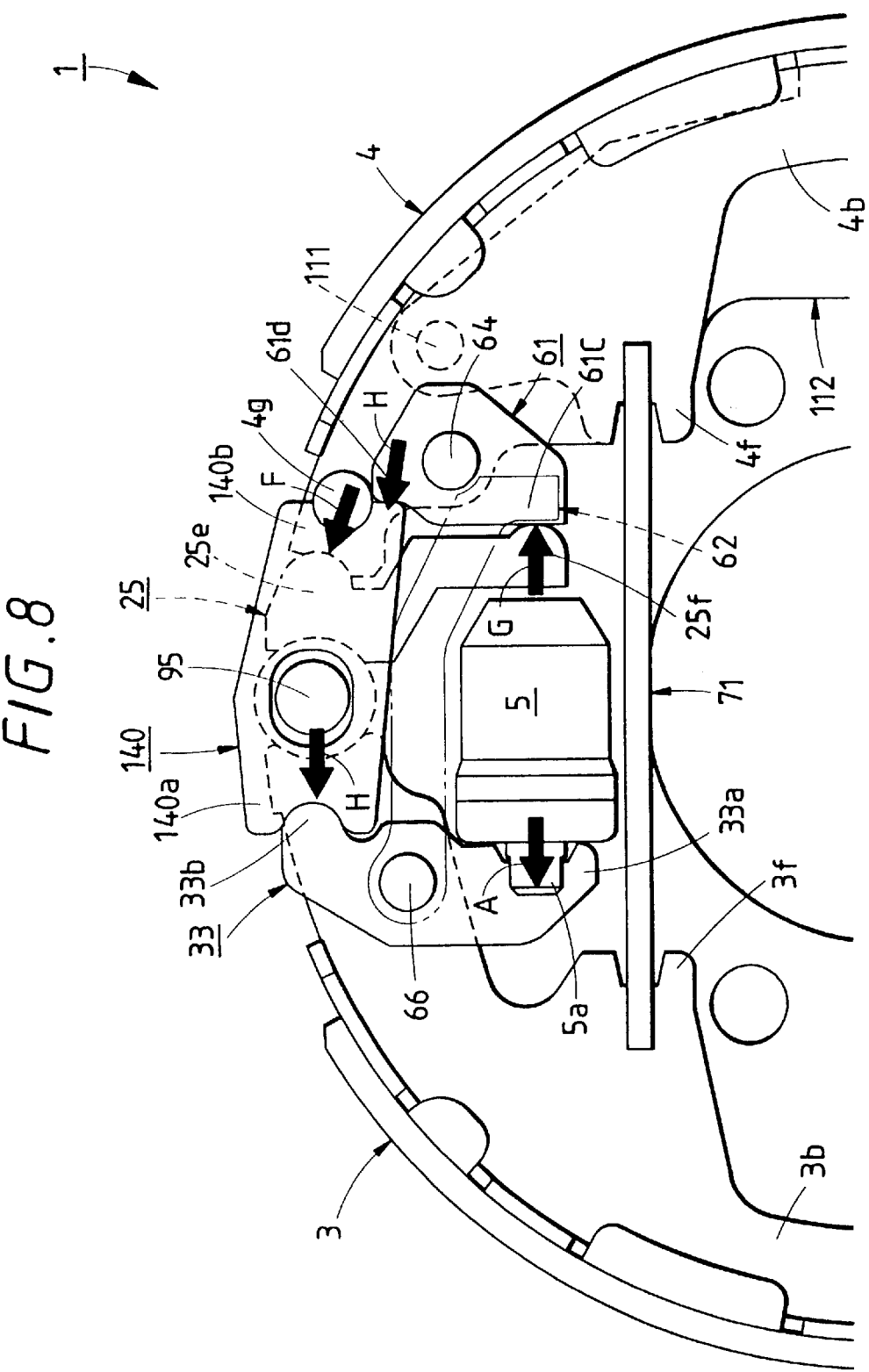
FIG. 8 is an enlarged, elevational view showing the major portion shown in FIG. 5, useful in explaining the operations of a control lever, a balance link and the pressure plate.
Figure 9:
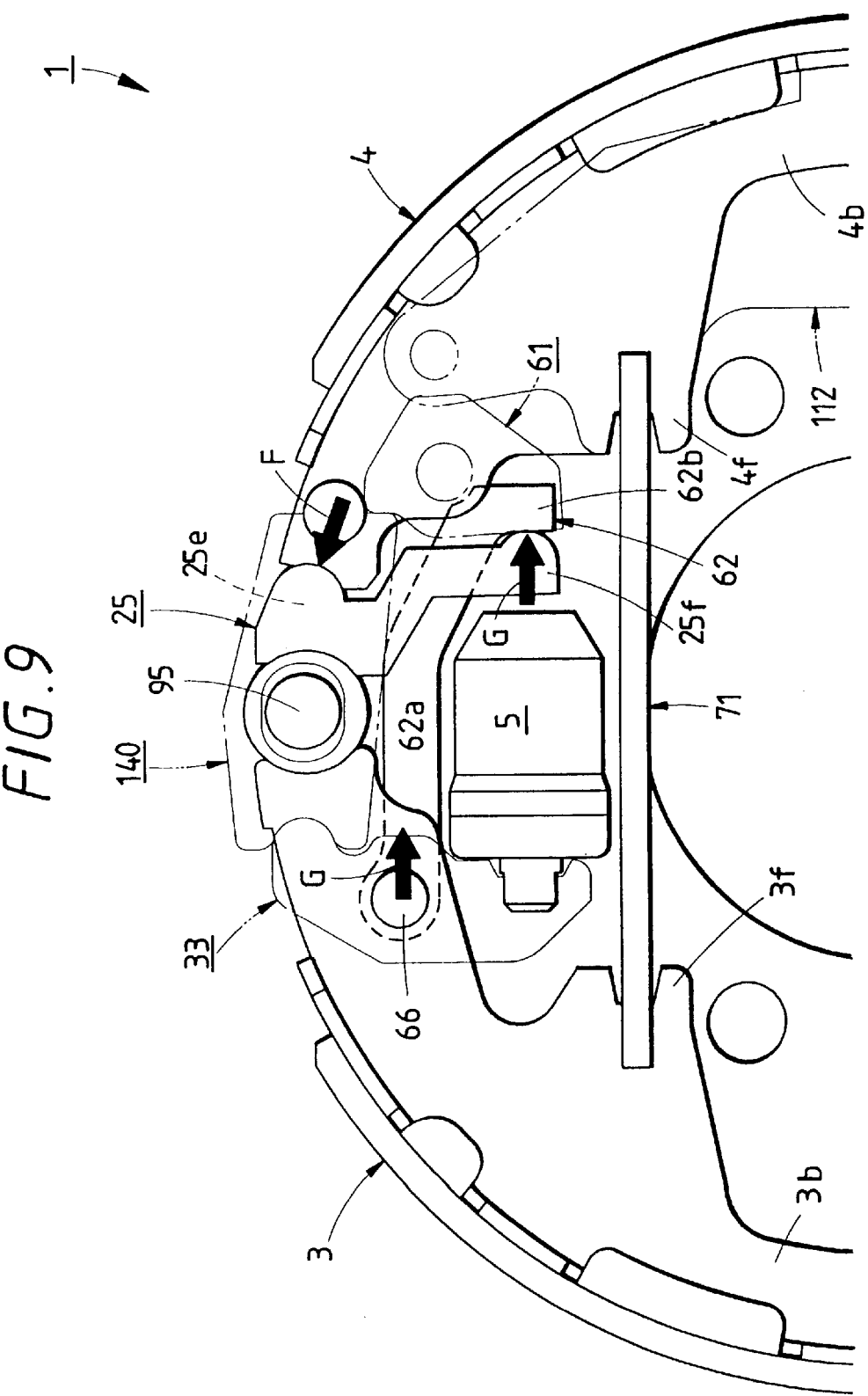
FIG. 9 is an enlarged, elevational view showing the major portion shown in FIG. 5, useful in explaining the operations of the control lever and a reaction lever.

FIG. 4 is a schematic elevational view of the overall structure of a drum brake according to a second embodiment of the present invention. FIG. 5 is an enlarged, elevational view showing a major portion of the drum brake of FIG. 4. FIG. 6 is an enlarged, elevational view showing the major portion shown in FIG. 5, useful in explaining the operations of a wheel cylinder, an input lever and a pressure plate. FIG. 7 is an enlarged, elevational view showing the major portion shown in FIG. 5, useful in explaining the operation of a parking lever. FIG. 8 is an enlarged, elevational view showing the major portion shown in FIG. 5, useful in explaining the operations of a control lever, a balance link and the pressure plate. FIG. 9 is an enlarged, elevational view showing the major portion shown in FIG. 5, useful in explaining the operations of the control lever and a reaction lever.

In the description to follow, the front side in the direction in which a brake drum is rotated forward is simply referred to as "front side", and this side in the direction in which the brake drum is rotated forward is simply referred to as "this side". Further, the inner side when viewed in the radial direction of the backing plate is referred simply to as "radially inner side", and the outer side in the same direction is referred to simply as "radially outer side".

A drum brake 1 forming a second embodiment of the present invention is equipped with a brake drum, not shown, which is rotated forward counterclockwise as indicated by an arrow R in FIG. 4. In the brake drum, the primary shoe 3 and the secondary shoe 4 are disposed opposite to each other on the backing plate 7, while being expandable.

The adjuster 6 intervenes between the front-side end portion 3e of the primary shoe 3 and the this-side end portion 4e of the secondary shoe 4. The adjuster 6 serves as a link member for those brake shoes and also as an adjusting means for adjusting a clearance between the sliding surfaces of those brake shoes and the brake drum. With use of the adjuster 6, counter force acting on the primary shoe 3 is input to this side of the secondary shoe 4 via the adjuster 6, and presses the secondary shoe 4 against the brake drum.

The anchor pin 95 stands erect on the surface of the backing plate 7 on the front side of the secondary shoe 4 and at a location opposite to the location of the adjuster 6. The anchor pin 95 receives the counter braking force acting on the secondary shoe 4. The wheel cylinder 5 as a driving means is planted at a position of the backing plate 1 on the radially inner side of the anchor pin 95.

The wheel cylinder 5 is provided with the piston 5a which is coupled with a brake pedal of a vehicle incorporating the drum brake 1 thereinto. The piston 5a is displaced from the wheel cylinder 5 toward the primary shoe 3 in accordance with a depressing force of the brake pedal by a driver in the vehicle.

The input lever 33 is pivotally supported on the web 3b of the primary shoe 3 by the lever pin 66 in such a manner that it may be swung in a plane parallel to the surface of the backing plate 7. The input lever 33 is formed with a high rigidity member (e.g., metal plate). The first end 33a of the input lever 33, which is located on the radially inner side, is in contact with the distal end of the piston 5a, while the second end 33b thereof located on the radially outer side is disposed near the anchor pin 95.

The anchor pin 95 is movably put in the pressure plate 140 which bridges a gap between the second end 33b of input lever 33 on the radially inner side and the engaging pin 4g planted in the fore-side end of the web 4b of the secondary shoe 4. The pressure plate 140 is formed with a high rigidity member (e.g., metal plate). The first end 140a of the pressure plate 140, located closer to the input lever 30, engages the second end 33b of the input lever 33 on the radially outer side, while the second end 140b thereof located on the secondary shoe 4 engages the engaging pin 4g of the secondary shoe 4. With the engagement, the pressure plate 140 is held to such an extent as to be positioned in place. The pressure plate 140 includes the through-hole 143 as an elongated hole formed in the middle position thereof. The anchor pin 95 is inserted into the through-hole 143 not tightly so that the pressure plate 140 may reciprocally be moved between the input lever 33 and the engaging pin 4g of the secondary shoe 4 without interfering with the anchor pin 95.

When the piston 5a of the wheel cylinder 5 is displaced toward the primary shoe 3, the input lever 33 is turned clockwise about the lever pin 66. The second end (radially-outer-side end) 33b of the input lever 33 will move toward the anchor pin 95. However, its movement is stopped at the first end 140a of the pressure plate 140. This means that a pressing force is applied to the lever pin 66. This pressing force expands the primary shoe 3 and the secondary shoe 4.

The control lever 25 is supported by the anchor pin 95 in such a manner that it may be swung thereabout in a plane parallel to the surface of the backing plate 7. In this supporting state of the control lever 25, the base end 25e of the control lever 25 on the radially outer side is sandwiched between the fore-side end of the secondary shoe 4 and the anchor pin 95.

When the base end 25e of the control lever 25 is pushed by the counter braking force acting on the anchor pin 95 from the secondary shoe 4, the control lever 25 is swung counterclockwise about the anchor pin 95 and the swinging end 25f of the control lever 25 on the radially inner side is moved toward the secondary shoe 4.

The balance link 61 is supported by the support shaft 64 on the upper surface of the web 4b of the secondary shoe 4 in a manner that it may be swung in a plane parallel to the surface of the backing plate 7. The radially-inner-side end 61c of the balance link 61, which is located on the radially inner side, is in contact with the swinging end 25f of the control lever 25, while the radially-outer-side end 61d thereof located on the radially outer side is in contact with the second end 140b of the pressure plate 140 closer to the secondary shoe 4. In this structure including the balance link 61, when the balance link 61 is pushed by the control lever 25, it is swung at a small angle counterclockwise about the support shaft 64 to move the pressure plate 140 toward the input lever 33.

The reaction lever 62, which is formed by pressing a thick metal plate, is disposed between the pressure plate 140 and the wheel cylinder 5, while being stretched between the primary shoe 3 and the secondary shoe 4.

The base end 62a of the reaction lever 62 is rotatably supported on the web 3b of the primary shoe 3 by the support shaft 31 by which the input lever 33 is pivotally supported on the web 3b of the primary shoe 3. The distal end 62b, bent like L, of the reaction lever 62 faces the swinging end 25f of the control lever 25, with a slight gap existing therebetween.

When the control lever 25 is pushed by the secondary shoe 4 and is swung about the anchor pin 95 at an angle in excess of a predetermined angle, the reaction lever 62 is brought into engagement with the swinging end 25f of the control lever 25 and moved toward the secondary shoe 4.

On the radially inner side than the wheel cylinder 5, the strut 71 is put between the engaging portion 3f of the primary shoe 3 and the engaging portion 4f of the secondary shoe 4. The strut 71 is formed with a high rigidity member (e.g., metal plate).

The operation of the thus constructed drum brake 1 will be described with reference to FIGS. 6 through 9.

When a driver depresses a brake pedal of a vehicle equipped with the drum brake 1, a hydraulic pressure is generated which depends on an amount of depression of the brake pedal by the driver, and is supplied to the wheel cylinder 5. In response to the hydraulic pressure, the piston 5a of the wheel cylinder 5 presses, with a pressing force A dependent on the hydraulic pressure, the first end 33a of the input lever 33 located on the radially inner side and moves it toward the primary shoe 3 (FIG. 6).

The input lever 33 is swung counterclockwise about the lever pin 66. With the swing, the second end 33b of the input lever 33 located on the radially outer side presses the pressure plate 140 with a pressing force B as the product of multiplying the pressing force A by a lever ratio of the input lever 33 and moves it toward the secondary shoe 4. As a result, the input lever 33 is pressed against the brake drum.

At the same time, a reaction force C generated when the pressure plate 140 is pressed to move with the pressing force B, acts on the lever pin 66 as a support shaft of the input lever 33. Therefore, the lever pin 66, or the primary shoe 3, is pressed against the brake drum.

Thus, the primary shoe 3 and the secondary shoe 4 are both pressed against the brake drum, to brake the rotation of the brake drum. When the counter braking force acting on the primary shoe 3 is input to the fore side of the secondary shoe 4 through the adjuster 6, the braking force by the secondary shoe 4 is further increased, and the braking force is more intensified or amplified.

To operate the drum brake 1 of the second embodiment in a parking brake mode, the swinging end 113 shown in FIG. 4 of the parking lever 112 is moved toward the primary shoe 3. Then, the parking lever 112 is swung clockwise about the end of the strut 71 closer to the secondary shoe 4 as a fulcrum, and presses the support shaft 111, namely, the secondary shoe 4 against the brake drum in the direction of an arrow D. At the same time, the parking lever 112 moves the strut 71 toward the primary shoe 3 to press the primary shoe 3 against the brake drum in the direction of an arrow E. As a result, the brake drum is impeded in its rotation, and the parking brake operates.

When the secondary shoe 4 is pressed against the brake drum in response to an ordinary braking operation, a counter braking force F acts on the anchor pin 95 from the secondary shoe 4 by way of the base end 25e of the control lever 25, as shown in FIG. 8. When the counter braking force F is input to the base end 25e of the control lever 25, the control lever 25 is swung counterclockwise about the anchor pin 95. Then, the swinging end 25f of the control lever 25 is moved toward the secondary shoe 4 to move the radially-inner-side end 61c of the balance link 61 toward the secondary shoe 4 with a pressing force G as the resultant of multiplying the counter braking force F by a lever ratio of the control lever 25.

In turn, the radially-outer-side end 61d of the balance link 61 moving the pressure plate 140 toward the input lever 33 with a pressing force H as the resultant of multiplying the pressing force G as the resultant of multiplying the force G by a lever ratio of the balance link 61.

Then, the input lever 33, or the primary shoe 3, is more intensively pressed against the brake drum with the sum of the pressing force A by the wheel cylinder 5 and the pressing force H by the pressure plate 140. As a result, the braking force by the primary shoe 3 is further increased. The increased counter braking force acting on the primary shoe 3 is input to the this side of the secondary shoe 4 to press the secondary shoe 4 against the brake drum, and therefore, the braking force by the secondary shoe 4 is further increased.

As described above, the drum brake 1 presses the primary shoe 3 and the secondary shoe 4 against the brake drum with a further increased pressing force by the utilization of the counter braking force F acting on the secondary shoe 4, whereby it produces a boosted braking force. That is, the drum brake 1 has a braking-force boosting function.

Thus, the drum brake 1 of the present embodiment produces a large braking force of high gain.

A gain of the braking force may be controlled by properly adjusting the lever ratios of the control lever 25 and the balance link 61.

When the braking forces by the primary shoe 3 and the secondary shoe 4 are increased, the counter braking force F that is input from the secondary shoe 4 through the base end 25e of the control lever 25 to the anchor pin 95, is also increased. When the counter braking force F input to the base end 25e of the control lever 25 increases to be in excess of a predetermined counter braking force, which is determined by the predetermined gaps between and the ratio of the related members, the control lever 25 is swung at a predetermined angle or greater.

Then, as shown in FIG. 9, the swinging end 25f of the control lever 25 engages the distal end 62b of the reaction lever 62 to move the reaction lever 62 toward the secondary shoe 4 with the pressing force G. As a result, the pressing force with which the input lever 33 presses the primary shoe 3 against the brake drum decreases, and hence the braking force by the primary shoe 3 decreases. Further, the counter braking force acting on the primary shoe 3 also decreases. As the result of the decrease of the counter braking force, the pressing force to press this side of the secondary shoe 4 against the brake drum decreases, the braking force by the secondary shoe 4 also decreases, and the counter braking force D that is input from the secondary shoe 4 to the anchor pin 95 also decreases.

The counter braking force F that is input from the secondary shoe 4 through the base end 25e of the control lever 25 to the anchor pin 95 decreases to below the predetermined counter braking force, which is determined by the gaps between and the ratios of the related members, the swing angle of the control lever 25 decreases to disengage the control lever 25 from the reaction lever 62. As a result, the pressing force to press the primary shoe 3 against the brake drum increases again, and the braking force of the drum brake increases again.

Thus, when the braking force exceeds a predetermined value of braking force, the drum brake 1 of the second embodiment automatically decreases the braking force. In other words, the drum brake 1 has also an automatic braking-force adjusting function.

As seen from the description thus far made, the drum brake 1 has two major functions; the braking-force boosting or amplifying function and the automatic braking-force adjusting function. When the drum brake 1 operates in the braking-force boosting mode, the primary shoe 3 and the secondary shoe 4 are pressed against the brake drum with a further increased braking force, by the utilization of the counter braking force F acting from the secondary shoe 4 on the anchor pin; the boosted or amplified braking force is produced. In the automatic braking-force adjusting mode, the drum brake 1 decreases the braking force when the braking force exceeds over a predetermined value of braking force.

In this respect, the present invention succeeds in providing a drum brake capable of producing a large and stable braking force.

It is noted that the wheel cylinder 5 is constructed so as to displace its piston 5a toward the primary shoe 3. With this construction, the input lever 33 may be disposed on the primary shoe 3 side with respect to the wheel cylinder 5. Further, the control lever 25, balance link 61, parking lever 112 and the like may be disposed on the secondary shoe 4 side with respect to the wheel cylinder 5. This feature allows the links and others to be disposed within a limited space without any installation difficulty.

Further, in the drum brake 1 of the present embodiment, the input lever 33, pressure plate 140, control lever 25, balance link 61 and reaction lever 62 are all disposed closer to the anchor pin 95 than the wheel cylinder 5.

With this feature, even if the clearance adjustment is performed and the primary shoe 3 and the secondary shoe 4 are deviated radially outward with the anchor pin 95 as a fulcrum, the positional deviation of the links, particularly the gaps between them, is extremely reduced. Therefore, the links can smoothly be operated with the minimized variation of the gaps between the links.

Next, a drum brake 1 according to a third embodiment of the present invention will be described.

Figure 10:
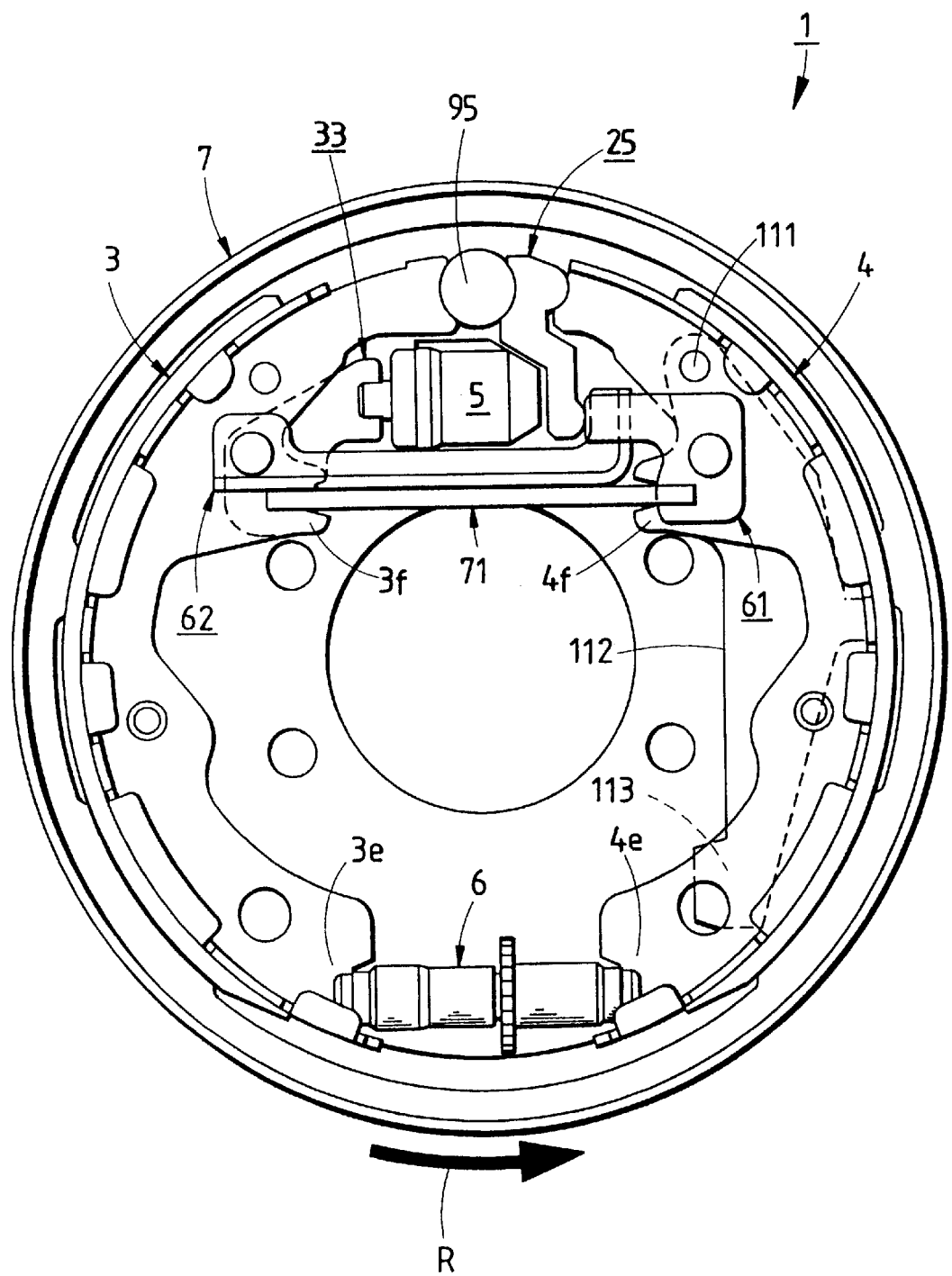
FIG. 10 is a schematic elevational view of an overall structure of a drum brake according to a third embodiment of the present invention.
Figure 11:
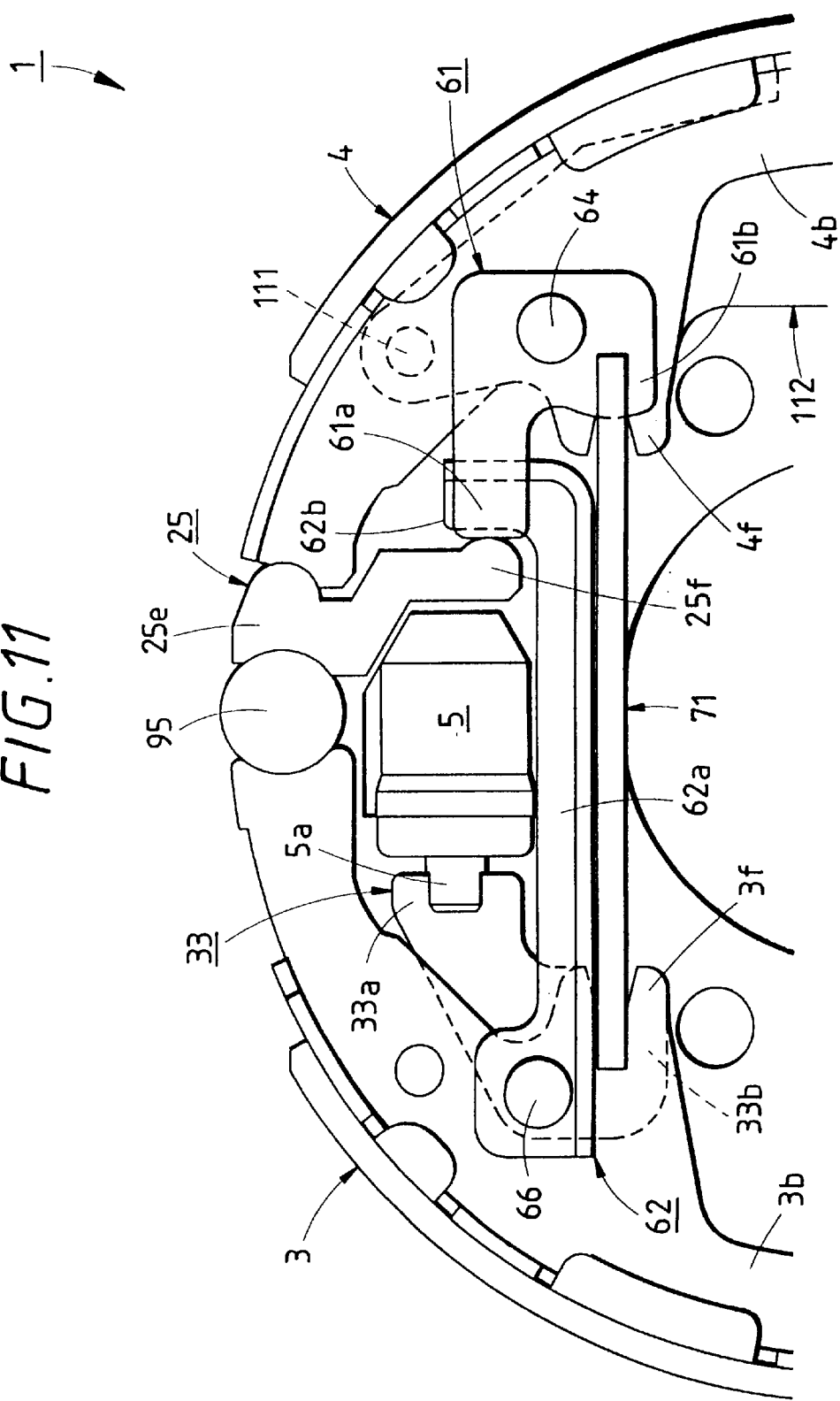
FIG. 11 is an enlarged, elevational view showing a major portion of the drum brake shown in FIG. 10.
Figure 12:
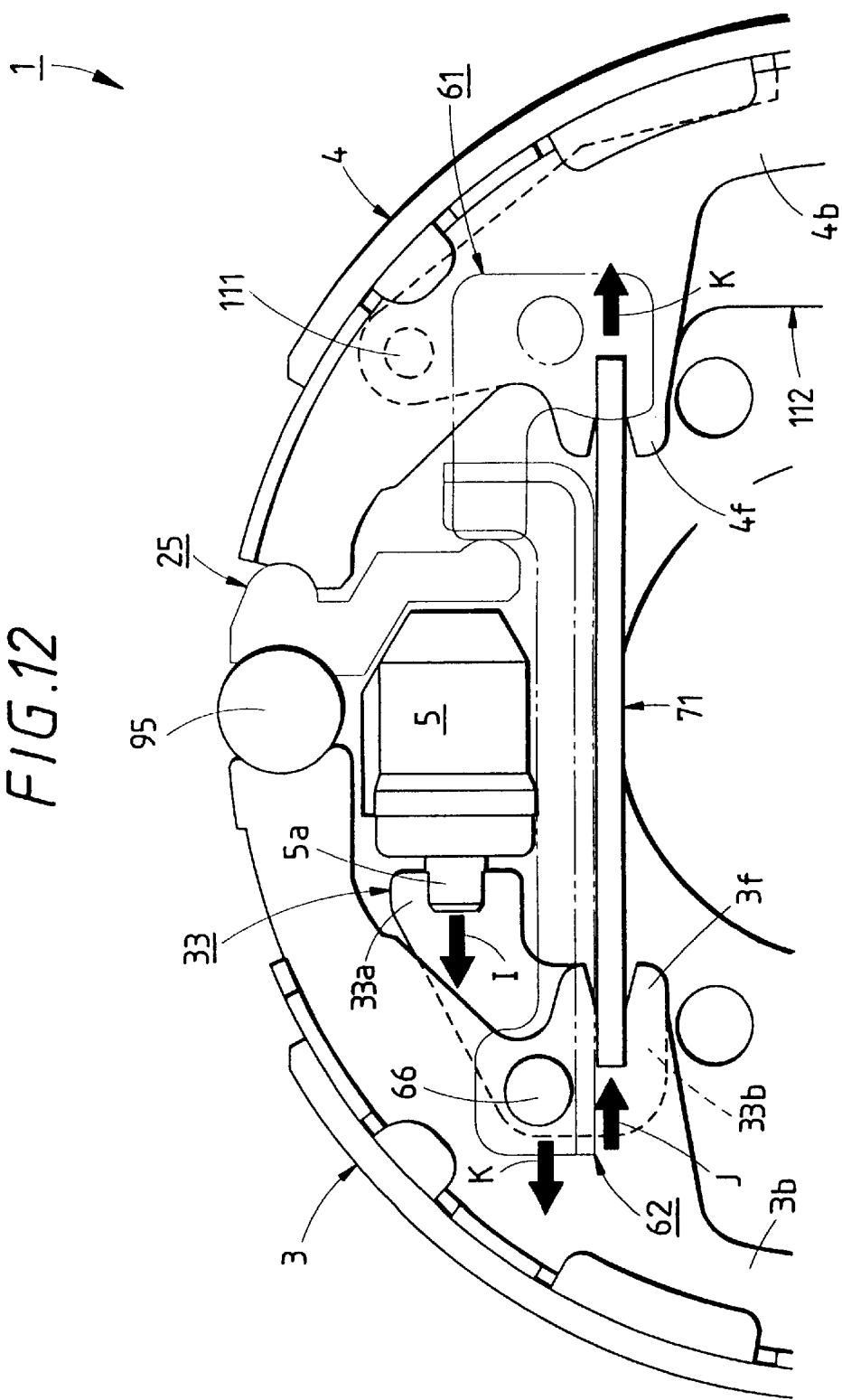
FIG. 12 is an enlarged, elevational view showing the major portion shown in FIG. 11, useful in explaining the operations of a wheel cylinder, an input lever and a strut.
Figure 13:
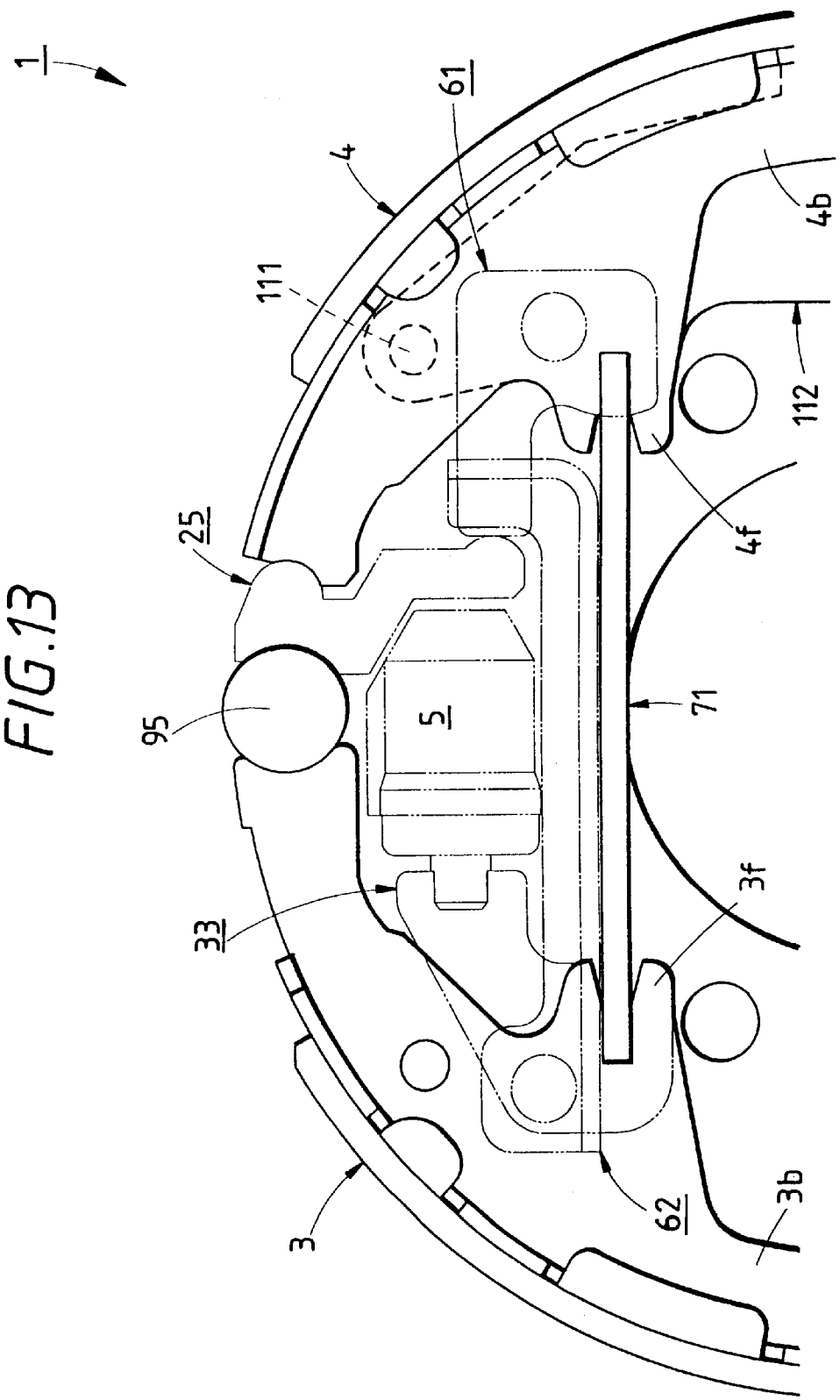
FIG. 13 is an enlarged, elevational view showing the major portion shown in FIG. 11, useful in explaining the operation of a parking lever.
Figure 14:
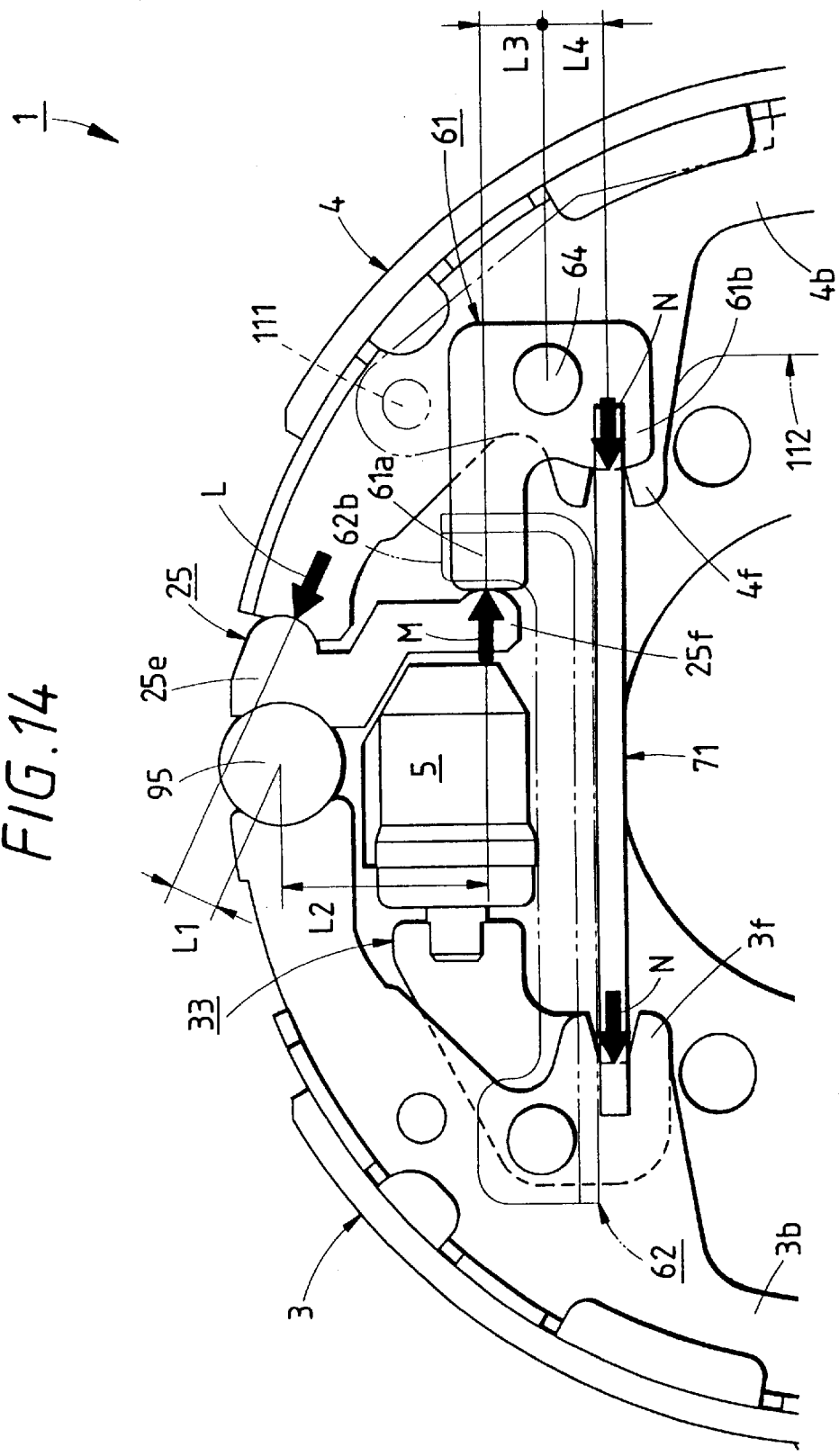
FIG. 14 is an enlarged, elevational view showing the major portion shown in FIG. 11, useful in explaining the operations of a control lever, a balance link and the strut.
Figure 15:
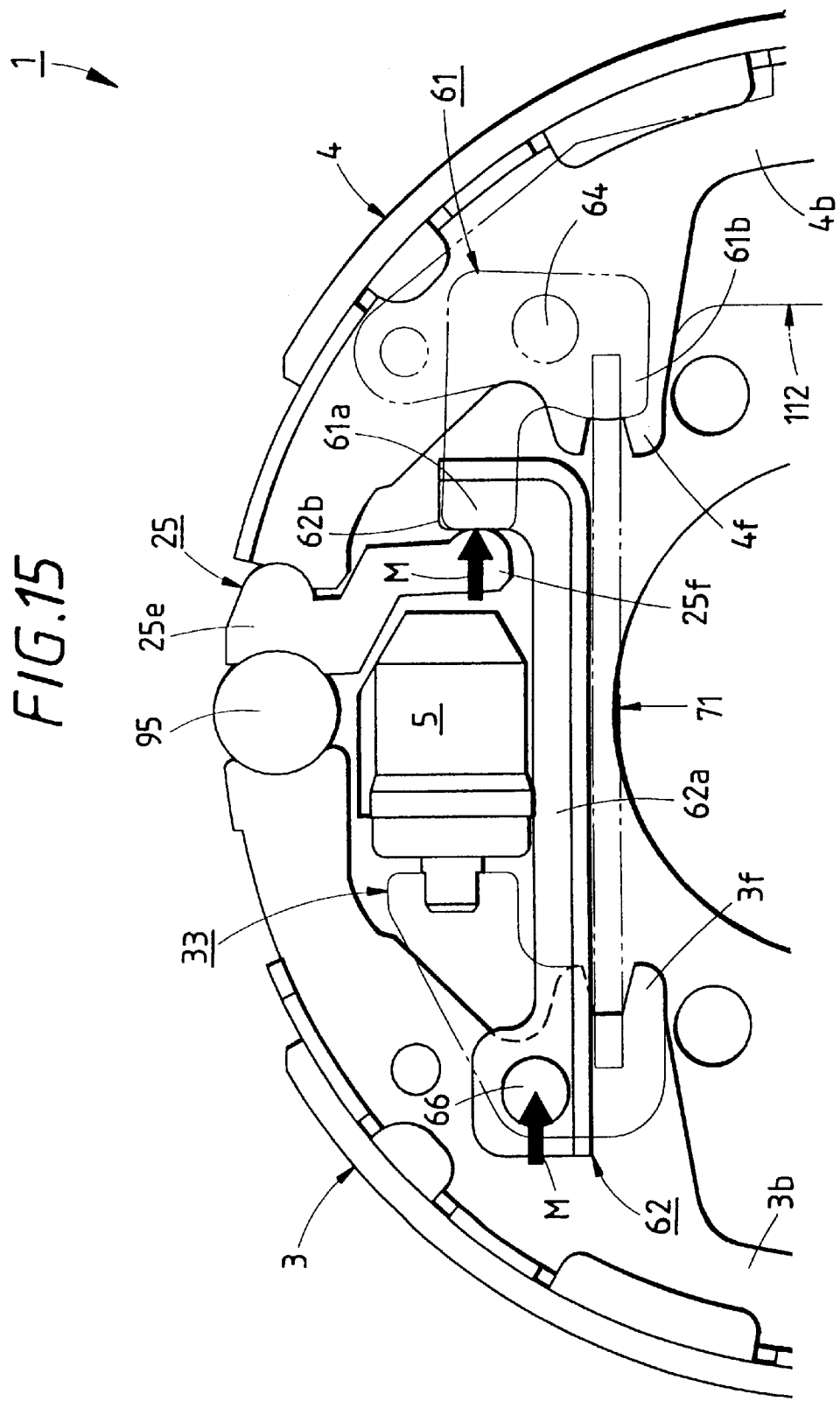
FIG. 15 is an enlarged, elevational view showing the major portion shown in FIG. 11, useful in explaining the operations of the control lever and a reaction lever.

FIG. 10 is a schematic elevational view of the overall structure of a drum brake according to the third embodiment of the present invention. FIG. 11 is an enlarged, elevational view showing a major portion of the derum brake shown in FIG. 10. FIG. 12 is an enlarged, elevational view showing the major portion shown in FIG. 11, useful in explaining the operations of a wheel cylinder, an input lever and a strut. FIG. 13 is an enlarged, elevational view showing the major portion shown in FIG. 11, useful in explaining the operation of a parking lever. FIG. 14 is an enlarged, elevational view showing the major portion shown in FIG. 11, useful in explaining the operations of a control lever, a balance link and the strut. FIG. 15 is an enlarged, elevational view showing the major portion shown in FIG. 11, useful in explaining the operations of the control lever and a reaction lever.

A drum brake constituting the third embodiment of the present invention will be described with reference to FIGS. 10 through 15.

A drum brake 1 according to the third embodiment of the present invention is equipped with a brake drum, not shown, which is rotated forward counterclockwise as indicated by an arrow R in FIG. 10. In the brake drum, the primary shoe 3 and the secondary shoe 4 are disposed opposite to each other on the backing plate 7, while being expandable.

The adjuster 6 intervenes between the front-side end portion 3e of the primary shoe 3 and the this-side end portion 4e of the secondary shoe 4. The adjuster 6 serves as a link member for those brake shoes and also as an adjusting means for adjusting a clearance between the sliding surfaces of those brake shoes and the brake drum. With use of the adjuster 6, counter force acting on the primary shoe 3 is input to this side of the secondary shoe 4 via the adjuster 6, and presses the secondary shoe 4 against the brake drum.

The strut 71 is stretched between the engaging portion 3f of the primary shoe 3 and the engaging portion 4f of the secondary shoe 4 in a state that both ends of the strut 71 are brought into engagement with those engaging portions 3f and 4f, respectively. The strut 71 is formed with a high rigidity member (e.g., metal plate). Therefore, when the strut 71 is moved toward the primary shoe 3, the primary shoe 3 is pressed against the brake drum, and when it is moved toward the secondary shoe 4, the secondary shoe 4 is pressed against the brake drum.

The anchor pin 95 stands erect on the surface of the backing plate 7 on the front side of the secondary shoe 4. The anchor pin 95 receives counter braking force acting on the secondary shoe 4. The wheel cylinder 5 as an operating means is planted at a position on the backing plate 7 on the radially inner side of the anchor pin 95.

The wheel cylinder 5 is provided with the piston 5a which is coupled with a brake pedal of a vehicle incorporating the drum brake 1 thereinto. The piston 5a is displaced toward the primary shoe 3, from the wheel cylinder 5 in accordance with a depressing force of the brake pedal by a driver in the vehicle.

The input lever 33 is disposed in a gap between the web 3b of the primary shoe 3 and the backing plate 7, while facing the strut 71 and the wheel cylinder 5. The input lever 33 is formed with a high rigidity member (e.g., metal plate).

The input lever 33 is supported on the web 3b of the primary shoe 3 by means of the lever pin 66 in such a manner that it may be swung in a plane parallel to the surface of the backing plate 7. The first end 33a of the input lever 33 is in contact with the distal end of the piston 5a, while the second end 33b thereof is in contact with the end portion of the strut 71 closer to the primary shoe 3.

In the structure of the input lever 33, when the piston 5a of the wheel cylinder 5 is displaced toward the primary shoe 3, the input lever 33 is swung counterclockwise (in the drawing) about the lever pin 31 as a support shaft; it moves the strut 71 to press the secondary shoe 4 against the brake drum, while its counter force presses the primary shoe 3 against the brake drum via the lever pin 66.

The control lever 25, machined from a metal block, is supported by the anchor pin 95 in such a manner that it may be swung about the anchor pin 95 in a plane parallel to the surface of the backing plate 7. The base end 25e of the control lever 25, which is located on the radially outer side, is in contact with the front-side end of the secondary shoe 4.

When the base end 25e of the control lever 25 is pushed by counter braking force of the secondary shoe 4 acting on the anchor pin 95, the control lever 25 is swung counterclockwise about the anchor pin 95, and the swinging end 25f of the control lever 25, which is located on the radially outer side, is moved toward the secondary shoe 4.

The balance link 61 is supported by the link pin 64 as a support shaft on the upper surface of the web 4b of the secondary shoe 4 in a state that it may be swung in a plane parallel to the surface of the backing plate 7. The end 61a of a long portion of the balance link 61 is in contact with the swinging end 25f of the control lever 25, while the end 61b of a short portion of the balance link 61 is in contact with the end of the strut 71, which is closer to the secondary shoe 4. In the structure of the balance link 61, when the balance link 61 is pushed by the control lever 25, it is swung at a small angle clockwise about the link pin 64 to move the strut 71 toward the primary shoe 3.

The reaction lever 62, which is formed by pressing a thick metal plate, is disposed between the strut 71 and the wheel cylinder 5, while being stretched between the primary shoe 3 and the secondary shoe 4.

The base end 62a of the reaction lever 62 is rotatably supported on the web 3b of the primary shoe 3 by the lever pin 66 by which the input lever 33 is pivotally supported on the web 3b of the primary shoe 3. The distal end 62b, bent like L, of the reaction lever 62 faces the swinging end 25f of the control lever 25, with a slight gap existing therebetween.

When the control lever 25 is pushed by the secondary shoe 4 and is swung about the anchor pin 95 at an angle in excess of a predetermined angle, the reaction lever 62 is brought into engagement with the swinging end 25f of the control lever 25 and moved toward the secondary shoe 4.

The operation of the thus constructed drum brake 1 will be described with reference to FIGS. 12 through 15.

When a driver depresses a brake pedal of a vehicle equipped with the drum brake 1, a hydraulic pressure is generated which depends on an amount of depression of the brake pedal by the driver, and is supplied to the wheel cylinder 5. In response to the hydraulic pressure, the piston 5a of the wheel cylinder 5 presses, with a pressing force I dependent on the hydraulic pressure, the first end 33a of the input lever 33 and moves it toward the primary shoe 3 (FIG. 12).

The input lever 33 is swung counterclockwise about the lever pin 66. With the swing, the second end 33 of the input lever 33 presses the strut 71 with a pressing force J as the product of multiplying the pressing force I by a lever ratio of the input lever 33 and moves it toward the secondary shoe 4. As a result, the input lever 33 is pressed against the brake drum.

At the same time, a reaction force K generated when the strut 71 is pressed to move with the pressing force J, acts on the lever pin 66 of the input lever 33. Therefore, the lever pin 66, or the primary shoe 3, is pressed against the brake drum.

Thus, the primary shoe 3 and the secondary shoe 4 are both pressed against the brake drum, to brake the rotation of the brake drum. When the counter braking force acting on the primary shoe 3 is input to the fore side of the secondary shoe 4 through the adjuster 6, the braking force by the secondary shoe 4 is further increased, and the braking force is more intensified or amplified.

To operate the drum brake 1 of the third embodiment in a parking brake mode, the swinging end of the parking lever 112 is moved toward the primary shoe 3 (FIG. 13). Then, the parking lever 112 is swung clockwise about the end of the strut 71 closer to the secondary shoe 4 as a fulcrum, and presses the support shaft 111, namely, the secondary shoe 4 against the brake drum. At the same time, the parking lever 112 moves the strut 71 toward the primary shoe 3 to press the primary shoe 3 against the brake drum. As a result, the brake drum is impeded in its rotation, and the parking brake operates.

When the secondary shoe 4 is pressed against the brake drum through the operation described referring to FIG. 14, a counter braking force L acts on the secondary shoe 4 as shown in FIG. 14. The counter braking force L is input to the base end 25e of the control lever 25. In turn, the control lever 25 is turned counterclockwise about the anchor pin 95. With the turn of the control lever 25, its swinging end 25f is moved toward the secondary shoe 4 to press the end 61a of the long portion of the balance link 61 and move it toward the secondary shoe 4, with a pressing force M as the product of multiplying the counter braking force L by a lever ratio (L1/L2) of the control lever 25.

The end 61b of the short portion of the balance link 61 presses the strut 71 and moves it toward the primary shoe 3, with a pressing force N as the product of multiplying the pressing force M by a lever ratio (L3/L4) of the balance link 61.

In turn, the primary shoe 3 is pressed against the brake drum with the pressing force I by the wheel cylinder 5 and the pressing force N by the strut 71. Therefore, the braking force by the primary shoe 3 is further increased. The increased braking force acting on the primary shoe 3 is input to this side of the secondary shoe 4, to thereby press the secondary shoe 4 against the braking force. Therefore, the braking force by the secondary shoe 4 is further increased.

A gain of the braking force may be controlled by properly adjusting the lever ratio (L1/L2) of the control lever 25 and the lever ratio (L3/L4) of the balance link 61.

When the braking force by the primary shoe 3 and the secondary shoe 4 is increased, the counter braking force L acting on the anchor pin 95 from the secondary shoe 4 is also increased. When the counter braking force L input to the base end 25e of the control lever 25 increases to be in excess of a predetermined counter braking force, which is determined by the predetermined gaps between and the ratios of the related members, the control lever 25 is swung at a predetermined angle or greater.

With the swing of the control lever 25, the swinging end 25f of the control lever 25 is brought into engagement with the distal end 62b of the reaction lever 62 to move the reaction lever 62 toward the secondary shoe 4 with the pressing force M.

As a result, the pressing force of the input lever 33 to press the primary shoe 3 upon the brake drum is decreased, and hence the braking force by the primary shoe 3 decreases. The counter braking force acting on the primary shoe 3 also decreases. Then, the pressing force to press this side of the secondary shoe 4 against the brake drum also decreases, the braking force by the secondary shoe 4 decreases, and the counter braking force L acting from the secondary shoe 4 on the anchor pin 95 decreases.

When the counter braking force L of the secondary shoe 4 acting on the anchor pin 95 decreases to below the predetermined counter braking force, which is determined by the predetermined gaps between and the ratios of the related members, the swing angle of the control lever 25 decreases to disengage the control lever 25 from the reaction lever 62. In turn, the pressing force to press the primary shoe 3 against the brake drum increases again, and the braking force of the drum brake increases.

Thus, when the braking force exceeds a predetermined value of braking force, the drum brake 1 of the third embodiment automatically decreases the braking force. In other words, the drum brake 1 has also an automatic braking-force adjusting function.

As seen from the description thus far made, the drum brake 1 has two major functions; the braking-force boosting or amplifying function and the automatic braking-force adjusting function. When the drum brake 1 operates in the braking-force boosting mode, the primary shoe 3 and the secondary shoe 4 are pressed against the brake drum with a further increased braking force, by the utilization of the counter braking force L acting from the secondary shoe 4 on the anchor pin; the boosted or amplified braking force is produced. In the automatic braking-force adjusting mode, the drum brake 1 decreases the braking force when the braking force exceeds over a predetermined value of braking force.

In this respect, the present invention succeeds in providing a drum brake capable of producing a large and stable braking force.

It is noted that the wheel cylinder 5 is constructed so as to displace its piston 5a toward the primary shoe 3. With this construction, the input lever 33 may be disposed on the primary shoe 3 side with respect to the wheel cylinder 5. Further, the control lever 25, balance link 61, parking lever 112 and the like may be disposed on the secondary shoe 4 side with respect to the wheel cylinder 5. This feature allows the links and others to be disposed within a limited space without any installation difficulty.

Figure 16:
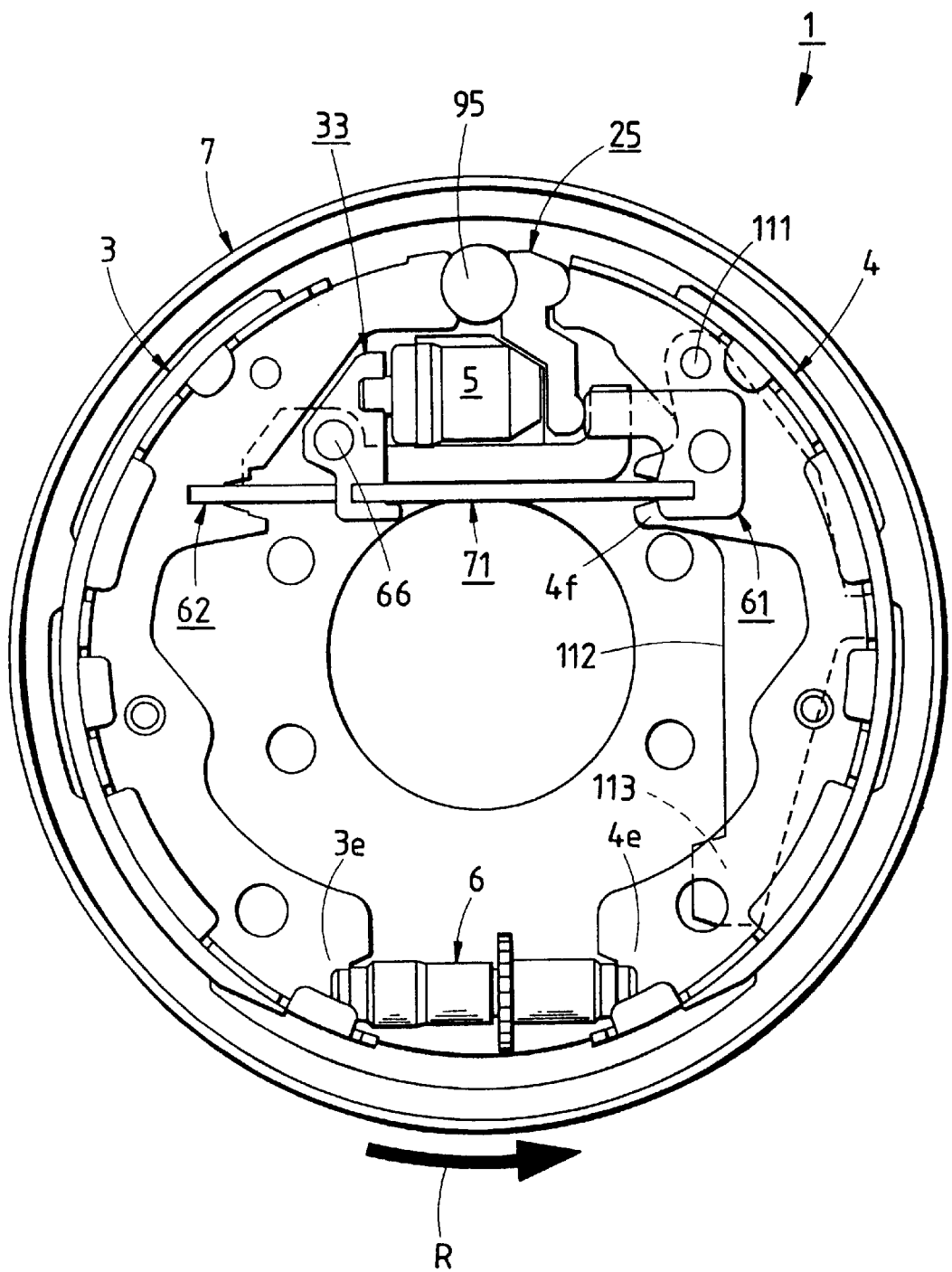
FIG. 16 is a schematic elevational view of the overall structure of a drum brake according to a fourth embodiment of the present invention.
Figure 17:
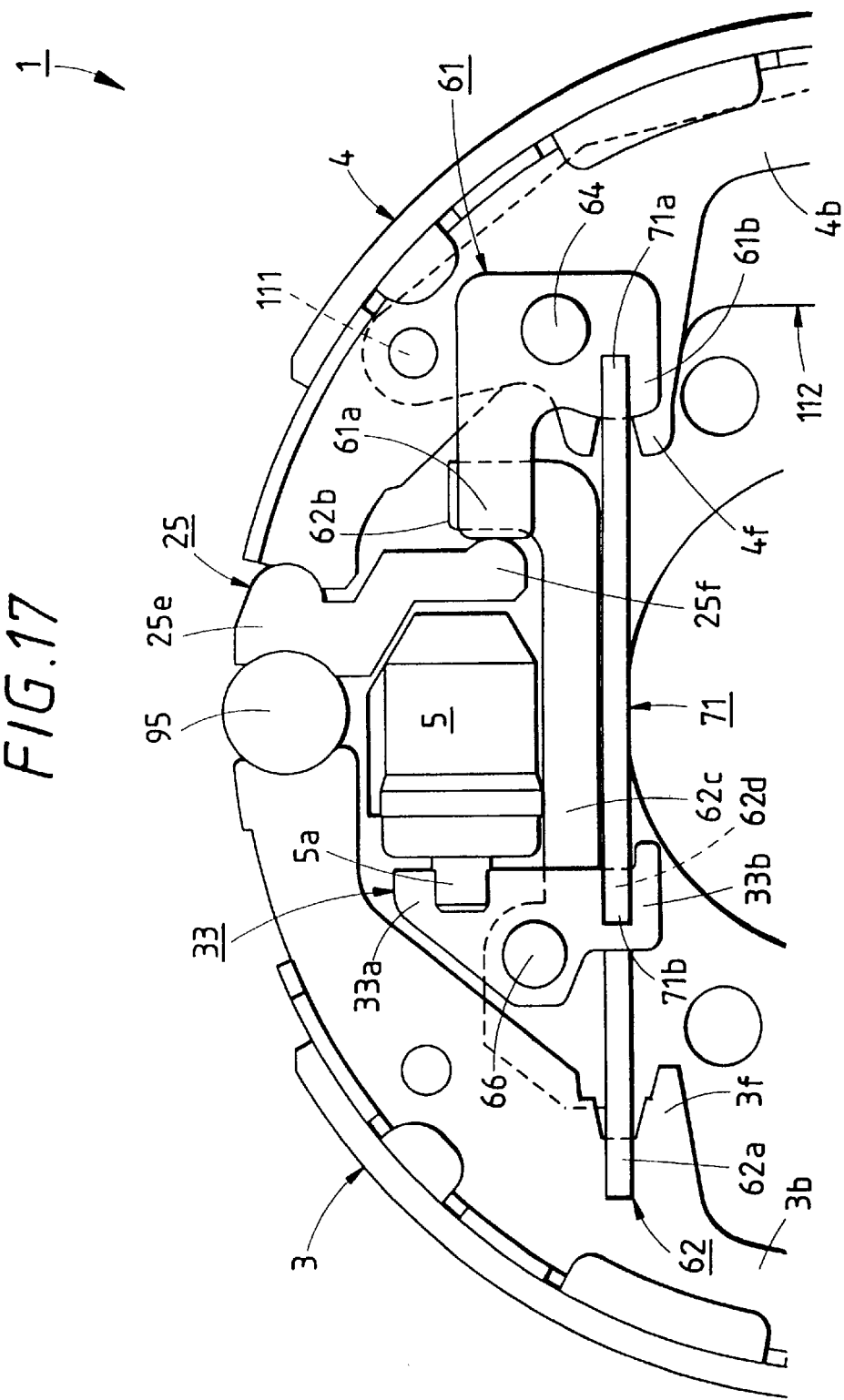
FIG. 17 is an enlarged, elevational view showing a major portion of the drum brake shown in FIG. 16.

FIG. 16 is a schematic elevational view of the overall structure of a drum brake according to a fourth embodiment of the present invention. FIG. 17 is an enlarged, elevational view showing a major portion of the drum brake shown in FIG. 16.

In this drum brake, the configurations of the input lever, the strut and the reaction lever and the interconnection of those components are modified to be different from those in the drum brake 1 of the third embodiment.

As shown in FIGS. 16 and 17, in the drum brake designated by reference numeral 1, the input lever 33 that is swung by the piston 5a of the wheel cylinder 5 is pivotally coupled to the reaction lever 62, not the web 3b of the primary shoe 3, by means of the lever pin 66.

The base end 62a of the reaction lever 62, which is located closer to the primary shoe 3, is brought into engagement with the engaging portion 3f of the web 3b of the primary shoe 3 in a state that it can transmit a pressing force in the direction to press the primary shoe 3 upon the brake drum.

The main portion 62c of the reaction lever 62 is extended toward the secondary shoe 4 while being disposed between the wheel cylinder 5 and the strut 71. The distal end 62b of the reaction lever 62 is bent shaped like L so as to be in engagement with the swinging end 25f of the control lever 25.

The first end 71a of the strut 71, which is located closer to the secondary shoe 4, engages with the web 4b of the secondary shoe 4b and the end 61b of the short portion of the balance link 61, as in the drum brake 1 of the third embodiment. The second end 33b of the strut 71, which is located closer to the primary shoe 3, engages with the second end 33b of the input lever 33 and the engaging portion 62c of the reaction lever 62, while it directly engages with the web 3b of the primary shoe 3 in the drum brake 1.

In operation, the piston 5a of the wheel cylinder 5 is placed to press the first end 33a of the input lever 33 and move the input lever 33 toward the primary shoe 3, and the input lever 33 is swung counterclockwise about the lever pin 66 to press the secondary shoe 4 upon the brake drum. Its reaction force is transmitted through the lever pin 66 to the reaction lever 62, which in turn presses the primary shoe 3 against the brake drum.

The swinging end 25f of the control lever 25 comes in engagement with the distal end 62b of the reaction lever 62. When the reaction lever 62 is pressed and moved toward the secondary shoe 4, a pressing force of the reaction lever 62 to press the primary shoe 3 against the brake drum decreases.

A pressing force of the parking lever 112 to move the strut 71 toward the primary shoe 3 is transmitted from the second end 71b of the strut 71 to the engaging portion 62d of the reaction lever 62. The reaction lever 62 presses the primary shoe 3 against the brake drum with this pressing force.

Except the above-mentioned operations, the operations of the drum brake 1 of the fourth embodiment are substantially the same as of the drum brake 1 of the third embodiment.

While the present invention has been described in detail by use of the aforementioned embodiments thereof, it should be understood that the invention is not limited to those embodiments, but may variously be changed, modified and altered within the true spirits of the invention.

The hydraulically operated wheel cylinder 5 is used for pressing the primary and secondary shoes 3 and 4 against the brake drum in the above-mentioned embodiments. It is evident that another equivalent means, e.g., a motor-driven actuator or a wire-cable operated link mechanism, may be used in place of the wheel cylinder 5.

As seen from the foregoing description, in the drum brake constructed according to the present invention, when the drum brake is in a braking mode, an anchor reaction force that is output from the secondary shoe at its intensity based on a magnitude of the braking effect is distributed at a predetermined ratio to the wheel cylinder and the anchor portion, which are separate from the wheel cylinder, via the control lever.

During the braking operation, when the anchor reaction force is amplified to have a value defined by a fixed magnification (viz., the braking effect reaches a value defined by a predetermined magnification), the urging force by the anchor reaction force acting on the control piston via the control lever increases above the urging force by the hydraulic pressure that is supplied from the master cylinder M/C and acts on the control piston. As a result, the control piston is displaced into the pressure chamber with the anchor reaction force.

The anchor-reaction-force control link mechanism operates with the displacement of the control piston. The reaction lever is pulled toward the secondary shoe by the balance link which is turned with the displacement of the control piston to load the urging force to move the primary shoe apart from the brake drum. As a result, the pressing force by the drive piston applied to the primary shoe is reduced, to thereby check the increase of the anchor reaction force.

Therefore, the mechanism stabilizes the braking effect so that a ratio of the anchor reaction force to the input force, or the hydraulic pressure, from the master cylinder is settled down at the fixed magnification, whereby the braking effect is checked in variation or stabilized.

In the drum brake, the anchor reaction force is distributed, at the predetermined ratio, to the anchor portion and the control piston, which are separate from the wheel cylinder, through the control lever. Therefore, the anti-load of the wheel cylinder may be set to be smaller than an anchor reaction force actually produced by the secondary shoe, when comparing with the structure where the anchor portion is integrally coupled to the cylinder body of the wheel cylinder and the anchor reaction force fully acts on the wheel cylinder. With this feature, a material not so rigid and not expensive may be used for constructing the cylinder body of the wheel cylinder. The thickness of the cylinder body may be reduced, leading to reduction of cost to manufacture, and reduction of size and weight.

Further, in the wheel cylinder, one drive piston is axially aligned with one control piston in a series fashion. With this feature, the size of the cylinder body when viewed in the direction of the piston diameter is may be reduced when comparing with the structure where those pistons are arrayed side by side.

The liquid chamber provided within the wheel cylinder may be only a single pressure chamber. Further, the function to prevent the increase of the anchor reaction force when the anchor reaction force output from the secondary shoe reaches a value defined by the fixed magnification, is exercised by the anchor-reaction-force control link mechanism. Therefore, there is no need of equipping the wheel cylinder with a hydraulic pressure control valve for controlling the supply of the hydraulic pressure to the pressure chamber. As a result, the structure of the cylinder body for slidably supporting both the pistons and defining the pressure chamber may be considerably simplified, and the number of component parts necessary for constructing the wheel cylinder is reduced. The result is to realize the size and cost reduction and to improve the reliability of the drum brake.

Thus, in the drum brake of the invention, the operation of the wheel cylinder can be controlled by the anchor reaction force output from the brake shoe. The structure of the wheel cylinder is simplified, and the wheel cylinder is reduced in size and weight. If the drum brake is applied to the duo-servo drum brake, the braking effect is stable, and assembling of the parking brake into the brake structure is easy. A brake system incorporating the drum brake of the invention is reduced in size and cost.

Further, in the drum brake of the present invention, the input lever, pressure plate, control lever, balance link and reaction lever are all disposed closer to the anchor pin than the driving means.

Therefore, even if as the result of the clearance adjustment, the primary shoe and the secondary shoe are deviated radially outward with the anchor pin as a fulcrum, the positional deviation of the links, particularly the gaps between them, is extremely reduced. Therefore, the links can smoothly be operated with the minimized variation of the gaps between the links.

As seen from the foregoing description, the drum brake constructed according to the present invention operates in the braking-force boosting mode and the automatic braking-force adjusting mode. In the braking-force boosting mode, the primary and secondary shoes are pressed against the brake drum with a further increased braking force, by the utilization of the counter braking force acting from the secondary shoe on the anchor pin. That is, in this mode, the boosted braking force is produced. In the automatic braking-force adjusting mode, the drum brake decreases the braking force when the braking force exceeds over a predetermined value of braking force.

Therefore, the drum brake of the invention is capable of producing a large and stable braking force.

A driving member of driving means is moved only toward the primary shoe. Therefore, the input lever may be disposed on the primary shoe side with respect to the wheel cylinder. Further, the control lever, balance link, parking lever and the like may be disposed on the secondary shoe side with respect to the wheel cylinder. This feature allows the links and others to be disposed within a limited space without any installation difficulty.

What is claimed is:

1. A drum brake comprising:

a primary shoe and a secondary shoe which are oppositely disposed within a brake drum;

a wheel cylinder being disposed between first ends of said primary shoe and said secondary shoe;

a backing plate having an anchor portion being in contact with said first ends of said primary shoe and said secondary shoe to receive counter braking forces from said primary shoe and said secondary shoe;

an input lever rotatably supported at an end of said primary shoe that is located near said anchor portion, wherein said wheel cylinder is fastened onto said backing plate at a location near said anchor portion, and when said wheel cylinder is brought into contact with one end of said input lever, an urging force is exerted on said primary shoe to press said primary shoe against an inner surface of said brake drum;

a pressure plate disposed between the other end of said input lever and said secondary shoe while being along a line including said anchor portion that is stretched therebetween;

a control lever held between said secondary shoe and said anchor portion, said control lever being swung about said anchor portion by the counter braking forces;

a balance link rotatably supported at an end of said secondary shoe that is located near said anchor portion, one end of said balance link being in contact with a swinging end of said control lever, while the other end of said balance link being in contact with said pressure plate, whereby when said control lever is swung, said balance link moves said pressure plate toward said primary shoe; and a reaction lever having one end held by a lever pin of said primary shoe and the other end of said reaction lever being extended toward said secondary shoe and allowed to engage the swinging end of said control lever, when said control lever comes in contact with said balance link and receives a predetermined counter braking force from said secondary shoe, the other end of said reaction lever engaging said swinging end of said control lever to input a force to said pressure plate to reduce a pressing force of said primary shoe.

* * * * *